(12) United States Patent
Rinne et al.

(10) Patent No.: US 9,241,341 B2
(45) Date of Patent: Jan. 19, 2016

(54) METHOD AND APPARATUS FOR PROVIDING CARRIER INDICATION AND CARRIER SENSING IN A WIRELESS NETWORK

(75) Inventors: Mika Rinne, Espoo (FI); Olav Tirkkonen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 12/867,246

(22) PCT Filed: Feb. 11, 2008

(86) PCT No.: PCT/IB2008/000302
§ 371 (c)(1),
(2), (4) Date: Aug. 11, 2010

(87) PCT Pub. No.: WO2009/101460
PCT Pub. Date: Aug. 20, 2009

(65) Prior Publication Data
US 2010/0311450 A1 Dec. 9, 2010

(51) Int. Cl.
*H04W 72/12* (2009.01)
*H04L 5/00* (2006.01)

(52) U.S. Cl.
CPC .......... *H04W 72/1278* (2013.01); *H04L 5/003* (2013.01); *H04L 5/006* (2013.01); *H04L 5/0007* (2013.01); *H04L 5/0053* (2013.01); *H04L 5/0062* (2013.01); *H04W 72/1226* (2013.01)

(58) Field of Classification Search
None
See application file for complete search history.

(56) References Cited

U.S. PATENT DOCUMENTS

| 7,269,198 | B1* | 9/2007 | Elliott et al. ............. 375/130 |
| 7,756,058 | B2* | 7/2010 | Cordeiro et al. ............. 370/252 |
| 7,944,886 | B2* | 5/2011 | Stephenson et al. .......... 370/331 |
| 8,014,345 | B2* | 9/2011 | Simms et al. ................ 370/328 |
| 2003/0119452 | A1 | 6/2003 | Kim et al. |
| 2004/0143842 | A1* | 7/2004 | Joshi ............................. 725/32 |
| 2004/0228304 | A1* | 11/2004 | Riedel et al. .................. 370/332 |
| 2007/0211686 | A1* | 9/2007 | Belcea et al. ................. 370/345 |
| 2007/0274272 | A1* | 11/2007 | Joshi et al. .................... 370/338 |
| 2007/0274320 | A1* | 11/2007 | Joshi et al. ................. 370/395.2 |
| 2008/0112371 | A1* | 5/2008 | Joshi et al. .................... 370/337 |
| 2008/0171552 | A1 | 7/2008 | Hyon et al. |
| 2010/0234010 | A1* | 9/2010 | Fischer ...................... 455/422.1 |

FOREIGN PATENT DOCUMENTS

| EP | 1732276 A1 | 12/2006 |
| EP | 1919244 A2 | 5/2008 |
| EP | 1 917 727 B1 | 6/2010 |
| WO | 2007023043 A1 | 3/2007 |
| WO | 2007031960 A | 3/2007 |
| WO | 2007031960 A2 | 3/2007 |

(Continued)

OTHER PUBLICATIONS

Office Action received in corresponding Mexican Application No. MX/a/2010/007908, Dated Nov. 9, 2011, 7 pages.

(Continued)

*Primary Examiner* — Alejandro Rivero
(74) *Attorney, Agent, or Firm* — Harrington & Smith

(57) ABSTRACT

An approach is provided for carrier indication and carrier sensing. Interference information relating to radio interface with one or more neighboring nodes is generated. The interference information is transmitted over a designated channel to the one or more neighboring nodes.

20 Claims, 16 Drawing Sheets

(56) References Cited

FOREIGN PATENT DOCUMENTS

| WO | 2007031961 A | 3/2007 |
|---|---|---|
| WO | WO-2007031960 A2 | 3/2007 |
| WO | 2007065365 A1 | 6/2007 |
| WO | 2007140046 A2 | 12/2007 |
| WO | 2008060763 A2 | 5/2008 |
| WO | 2008135833 A2 | 11/2008 |

OTHER PUBLICATIONS

International Search Report and Written Opinion of the International Searching Authority for corresponding International Patent Cooperation Treaty Application PCT/IB2008/000302, dated Nov. 26, 2008, (14 pages).

Omiyi et al., "Analysis of TDD Cellular Interference Mitigation Using Busy-Bursts", IEEE Transactions on Wireless Communications, vol. 6. No. 7, Jul. 2007.

IEEE 802.16-2004, IEEE Standard for Local and metropolitan area networks Part 16: Air Interface for Broadband Wireless Access Systems, May 29, 2009.

"Link Adaptation Scheme for Single-antenna Transmission in E-UTRA Downlink", 3GPP TSG-RAN WG1 Meeting #44, R1-060306, (7 pages).

Haas et al., "Dual Busy Tone Multiple Access (DBTMA)—A Multiple Access Control Scheme for Ad Hoc Networks", IEEE Transactions on Communications, vol. 50, No. 6, Jun. 2002, (11 pages).

Auer et al., "Interference avoidance concepts", IST-4-027756 Winner II D4.7.2 v1.0, (85 pages).

IEEE Standards Activities Department: "IEEE 802.22/WDv0.4.5. Draft Standard for Wireless Regional Area Networks Part 22: Cognitive Wireless RAN Medium Access Control (MAC) and Physical Layer (PHY) specifications: Policies and Procedures for Operation in the TV Bands" [Online] Jan. 2008.

"Patent Examination Report #1", Australian Patent Application No. 200850547, issued Dec. 6, 2012. 3 pgs.

* cited by examiner

METHOD AND APPARATUS FOR PROVIDING CARRIER INDICATION AND CARRIER SENSING IN A WIRELESS NETWORK

RELATED APPLICATION

This application was originally filed as PCT Application No. PCT/IB2008/000302 filed Feb. 11, 2008.

BACKGROUND

Radio communication systems, such as a wireless data networks (e.g., Third Generation Partnership Project (3GPP) Long Term Evolution (LTE) systems, spread spectrum systems (such as Code Division Multiple Access (CDMA) networks), Time Division Multiple Access (TDMA) networks, WiMAX (Worldwide Interoperability for Microwave Access), etc.); provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of effort involves mitigating or accounting for interference conditions in a radio environment.

SOME EXEMPLARY EMBODIMENTS

Therefore, there is a need for an approach for optimizing local radio network resources. This may be achieved according to an embodiment of the invention through sensing the neighborhood of nodes and exchanging signaling messages between the nodes. This kind of sensing and messaging may comprise, for example, interference measures, interference information or node addressing information.

According to one embodiment of the invention, a method comprises generating information relating to a radio interface with one or more neighboring nodes within a neighborhood based on sensing from the neighborhood. The method also comprises transmitting the interference information over a designated channel to the one or more neighboring nodes.

According to another embodiment of the invention, an apparatus comprises logic configured to generate information relating to a radio interface with one or more neighboring nodes within a neighborhood based on sensing from the neighborhood. The information is transmitted over a designated channel to the one or more neighboring nodes.

According to another embodiment of the invention, a method comprises sensing a carrier indication channel to retrieve interference information, from a node, relating to interference produced by the node.

According to another embodiment of the invention, an apparatus comprises a carrier sensing module configured to sense a carrier indication channel to retrieve interference information, from a node, relating to interference produced by the node.

According to another embodiment of the invention, a method comprises categorizing resources of a network into a plurality of allocation zones, wherein a plurality of nodes within a neighborhood are configured to monitor a dedicated channel to obtain interference information relating to radio interface with one or more other neighboring nodes. The interference information specifies which of the allocation zones are utilized by the nodes. The method further comprises allocating one of the resources by avoiding concurrent use of one or more of the allocation zones to minimize the interference.

According to yet another embodiment of the invention, an apparatus comprises a resource allocation logic configured to categorize resources of a network into a plurality of allocation zones, wherein a plurality of nodes within a neighborhood are configured to monitor a dedicated channel to obtain interference information relating to radio interface with one or more other neighboring nodes. The interference information specifies which of the allocation zones are utilized by the nodes. The resource allocation logic is further configured to allocate one of the resources by avoiding concurrent use of one or more of the allocation zones to minimize the interference.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENTS

Figure 1A:
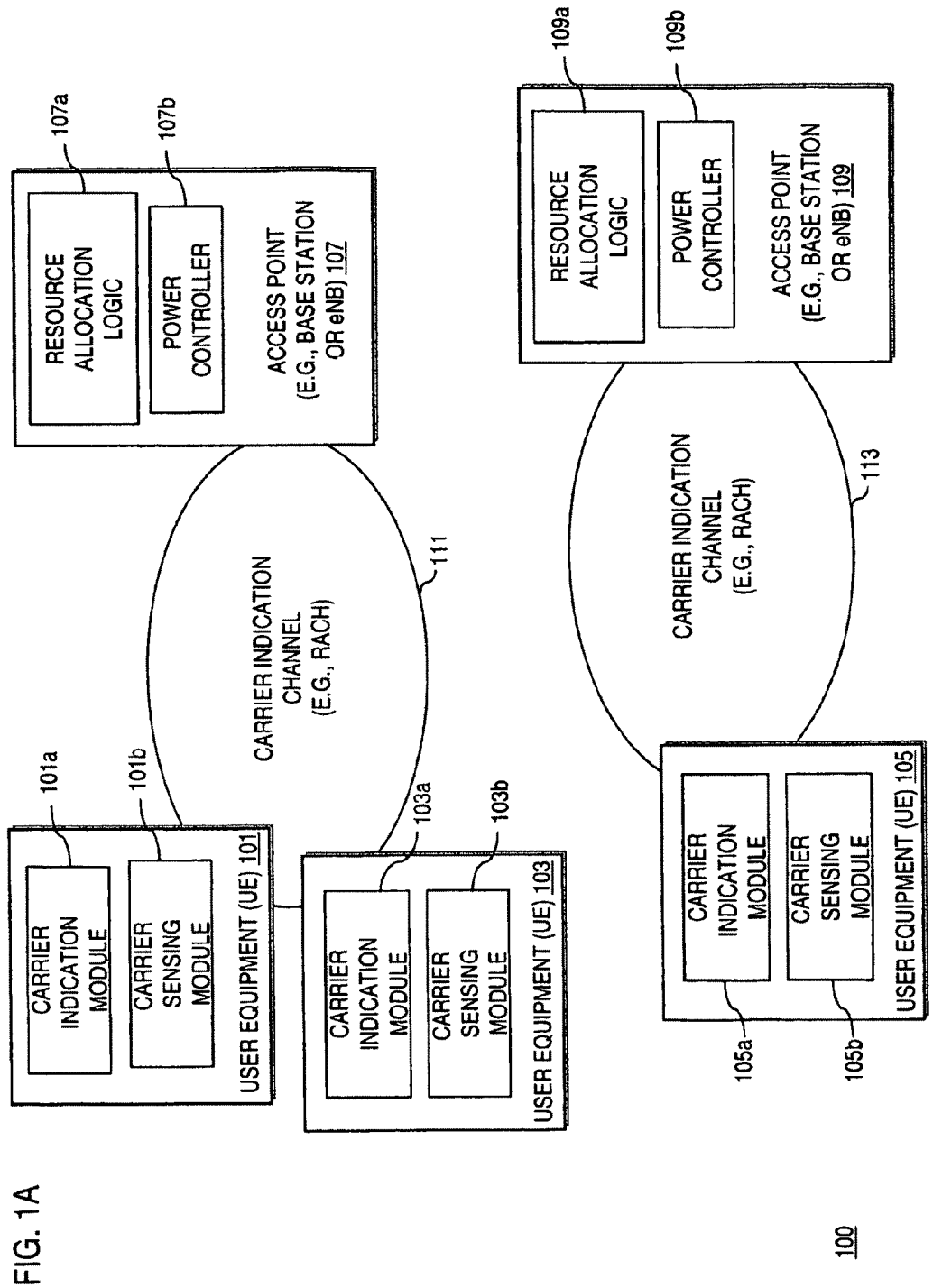
FIGS. 1A-1D are, correspondingly, diagrams of a communication systems capable of providing a channel for carrier sensing and/or carrier indication within a neighborhood of nodes, and a flowchart of a process for establishing the neighborhood, according to various exemplary embodiments of the invention.

An apparatus, method, and software for channel sensing and channel indication are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a communication network having a Third Generation Partnership Project (3GPP) Evolved Universal Terrestrial Radio Access (E-UTRA) architecture, it is recognized by one of ordinary skill in the art that the embodiments of the inventions have applicability to any type of communication system and equivalent functional capabilities.

FIGS. 1A-1D are, correspondingly, diagrams of a communication systems capable of providing a channel for carrier sensing and/or carrier indication within a neighborhood of nodes, and a flowchart of a process for establishing the neighborhood, according to various exemplary embodiments of the invention. A system 100, in an exemplary embodiment, employs International Mobile Telecommunications—Advanced (IMT-A) technology, including 3GPP E-UTRA and Institute of Electrical and Electronics Engineers (IEEE) 802.16. As shown in FIG. 1, one or more user equipment (UEs) 101, 103, and 105 communicate with corresponding access points (AP) 107 and 109, such as a base station, which is part of an access network (e.g., 3GPP LTE (or E-UTRAN or 3.9G), WiMAX (Worldwide Interoperability for Microwave Access), etc.). Under the 3GPP LTE architecture, each of the base stations 107 and 109 is denoted as an enhanced Node B (eNB). The UEs 101, 103, and 105 can be any type of mobile stations, such as handsets, terminals, stations, units, devices, or any type of interface to the user (such as "wearable" circuitry, etc.). As shown, access point 107 serves UEs 101 and 103, and is configured to allocate resources, via a resource allocation logic 107a, of communication links (e.g., downlink and/or uplink) to these UEs 101 and 103. The access point 107 also utilizes a power controller 107b to ensure power transmission levels are controlled efficiently and do not result in interference with other nodes. Similarly, access point 109 includes a resource allocation logic 109a and a power controller 109b. This access point 109 is the serving node for UE 105. It is contemplated that such functionalities can exist in any of the nodes, e.g., user equipment 101, 103, and 105.

Emerging radio systems will challenge planned, regular network layouts and will extend to irregular topologies, self organizing networks and automatic network parameterization. Further, the seamless operation in a peer-to-peer network, indoor and outdoor microcellular environments to complete the wide area networking provided by cellular (wireless) will set new challenges for networking at the radio layers. These mechanisms include communication channels other than a sole radio link between a terminal and a base station. The operational environment can also render obsolete the clearly separate roles of a base station and a terminal, as they may be expected to operate on equal power classes and equal functionalities. This is unlike the conventional systems, whereby separate standard specifications are developed for terminals and base stations (e.g., access points).

As high capacity (and coverage) is needed for short range communications in changing locations, making a ubiquitous, tight and fixed network may not be economically feasible. Instead, the networking has to occur between nodes that exist in the communication area at a time. These new operational conditions will require ad hoc networking, where many of the nodes locate non-uniformly and irregularly in the communications area and only some of the nodes in the area are fixed base stations (access points) to provide the gateway to, for instance, the Internet.

From a bandwidth efficiency perspective, it may be expected that interfering systems or nodes operate on the same frequency band within the same geographical area (it is noted that these systems may also need to be frame synchronized). In addition, switching points between downlink and uplink can be autonomously set in different cells by a serving node. Therefore, interference coordination plays an important role in efficient management of network resources.

Further, it is observed that uncoordinated allocations are a common occurrence in the cells (and deployments are frequently un-planned) of conventional systems. Thus, interference can be problematic and at times severe. Such interference may significantly degrade network performance or may even collapse in certain regions (or neighborhoods) due to creation of "dead-zones." This interference problem is caused, in part, by the assumed duplex mode of operation of the nodes, where interference conditions exist among Access Points (AP) and User equipments (UE)—e.g., AP-AP, AP-UE, UE-AP and UE-UE interference.

Consequently, the serving nodes 107 and 109 need to optimize their resource allocations for bandwidth efficient operation. The system 100, according to certain embodiments, designates a channel (denoted as "channel indication (CI)-channel") for carrier sensing and carrier indication to convey interference conditions within a neighborhood—i.e., within a transmission range of a node.

For example, the AP 107 would consider the UEs 101, 103 as neighboring nodes, and thus, constitutes a neighborhood of the AP 107. This neighborhood supports CI channel 111. Similarly, the AP 109 has within its neighborhood UE 105; the neighborhood provides CI channel 113. According to one embodiment, under a time-frequency multiplexed transmission technology, such as E-UTRA or IEEE 802.16, a new channel type is defined.

The CI-channel 111, 113 can, for example, carry signaling for the indication of channel reservation, and can provide strong interference observations. Also, the channel 111, 113 is detectable by any peer entity in a given propagation neighborhood. For instance, in the neighborhood of the AP 107, the CI-channel 111 is detectable by UEs 101 and 103. According to one embodiment, the CI-channel 111 can be established and associated signaling transmitted by the UE 101 based on the scheduling information that the UE 101 has received from its serving access point 107. The CI-channel 111 of UE 101 can be sensed by other UEs (e.g., UE 103) within its neighborhood. The range of the sensing neighborhood can be tuned by power control (e.g., power ramping) of the CI-channel; this capability can reside within the AP 107 with power controller 107b.

To indicate potential interference conditions, the UEs 101, 103, and 105 are configured with respective carrier indication modules 101a, 103a, and 105a. Additionally, to retrieve interference information (as signaled through the CI channel), carrier sensing modules 101b, 103b, and 105b are utilized within the UEs 101, 103, and 105, respectively.

Figure 1B:
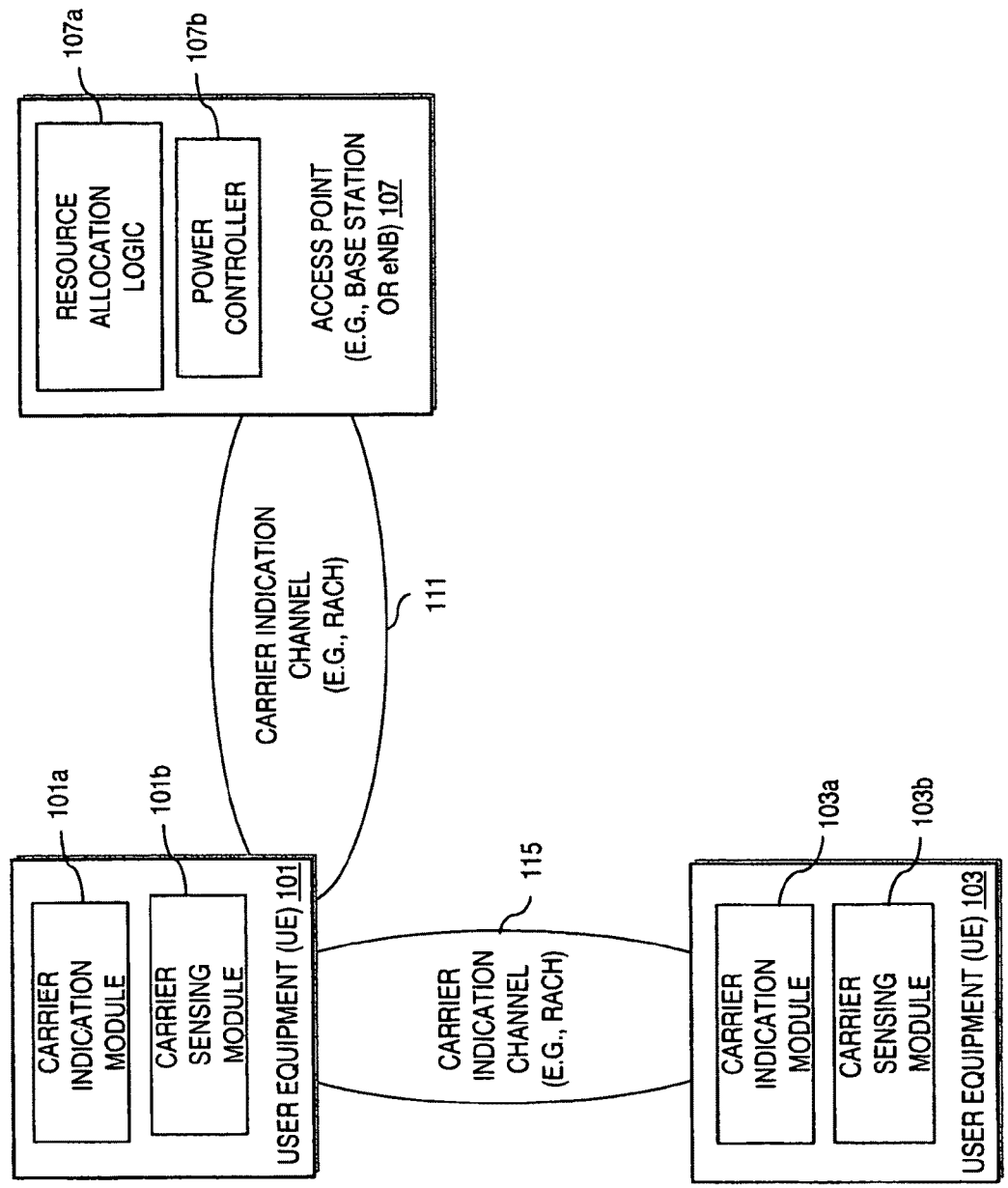
Figure 1C:
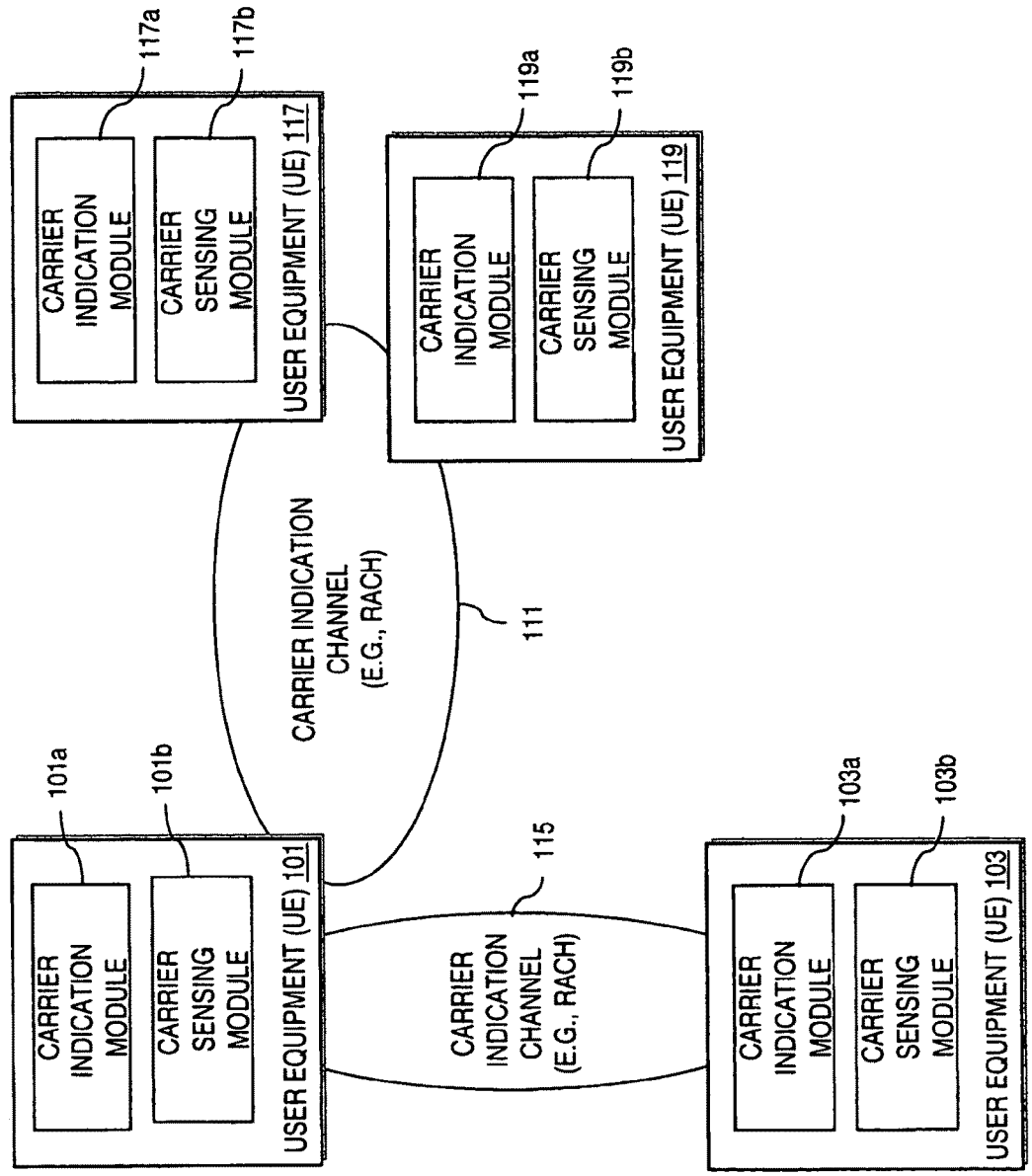

In addition to the configuration of FIG. 1A, a carrier indication channel 115 can be established between the UE 101 and UE 103 (shown in FIG. 1B). Further, as seen in FIG. 1C, the system 100 can provide an architecture in which the network elements (or nodes) are user equipment 101, 103, 117, and 119, wherein the carrier indication channel 111, 115 can be provided among two or more user equipment. For example, the carrier indication-channel 111 is provided for UEs 101, 117, and 119. It is contemplated that in addition to the architectures of FIGS. 1A-1C, other configurations may be deployed.

Figure 1D:
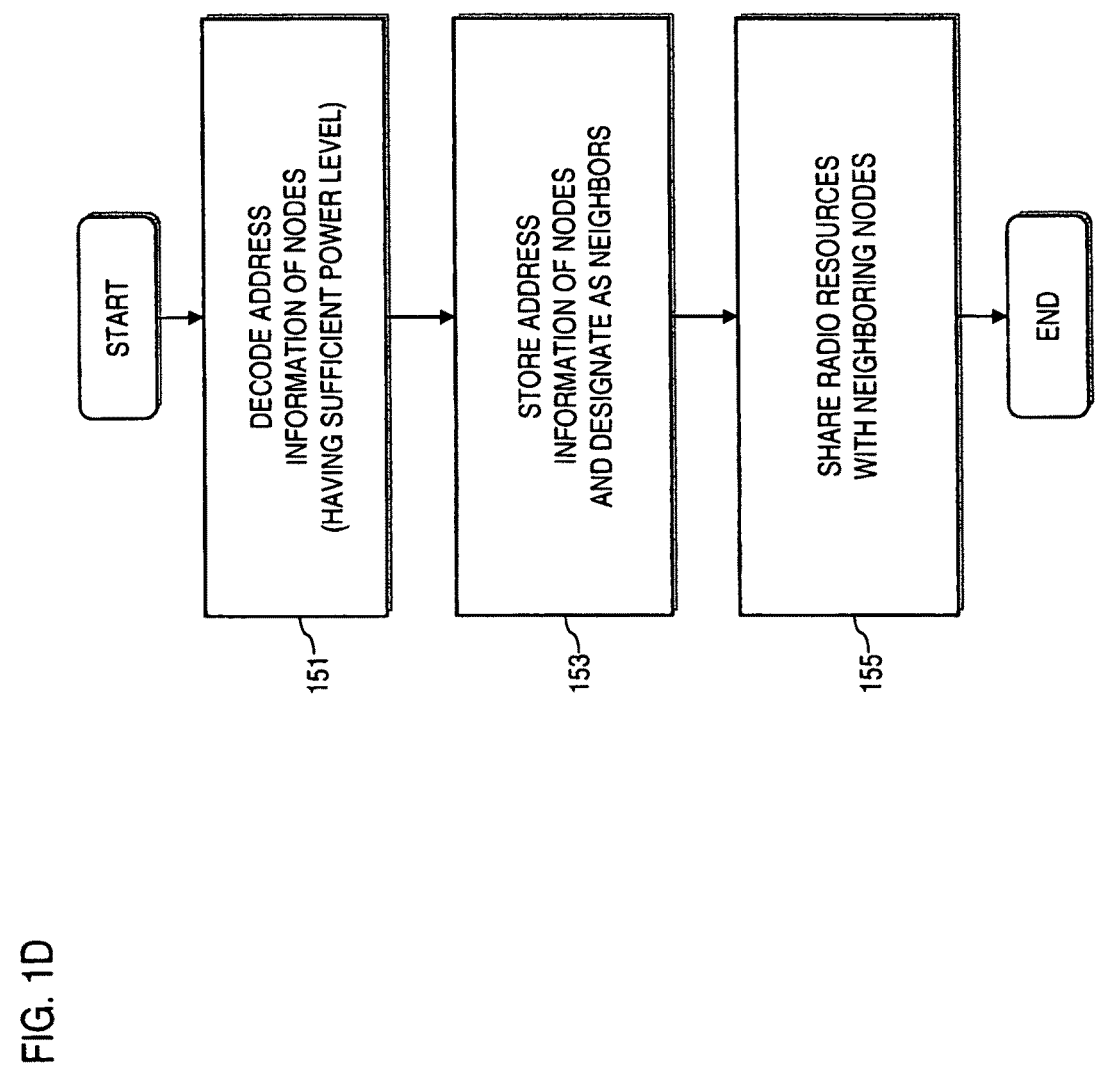

FIG. 1D shows a flowchart of a process for establishing the neighborhood, according to one embodiment of the invention. The system 100 provides for the capability to form a neighborhood solely by address information of the nodes. In this embodiment, the sensing covers decoding the address of each neighbor that it can receive with sufficiently high power (step 151). In step 153, the addresses are then stored, and designated as neighbors. In other words, the node itself maintains a list of its neighboring nodes for the purpose of sharing radio resources accordingly. One example of this involves sharing of radio resource for indexed nodes in the address list of a node using a round robin scheme or proportional fair weighted scheme (step 155).

The carrier sensing modules and carrier indication modules can measure, calculate or estimate interference conditions as well as generate interference information relating to radio interface with one or more neighboring nodes. This interference information may further be transmitted over a designated channel to the one or more neighboring nodes. Among the neighboring nodes, communication channels can be used at least partly based on the interference information available. The sharing of radio resources (i.e., radio resource management, such as selecting the communication resources in time, frequency code and spatial domains, scheduling traffic (packets), controlling the channel power and the transmission angles of signals) include awareness (interference) of the arbitrary neighborhood of nodes.

The above system 100 (according to the various architectures of FIGS. 1A-1C) provides transmission of the carrier indication to neighboring nodes as well as detection of such carrier indication by this carrier sensing neighborhood. It is contemplated that the two distinct functions of sensing and indication can be utilized independently. As used herein, neighboring nodes are nodes that operate within each others' range. Additionally, the system 100, according to certain embodiments, permits the gathering, by measurements, for example, information about interferers that are present due to deterministic allocations by a network node (e.g., access point allocations) and about other exceptionally strong interferers from unknown sources. This approach is further illustrated in the exemplary system of FIG. 2.

Figure 2:
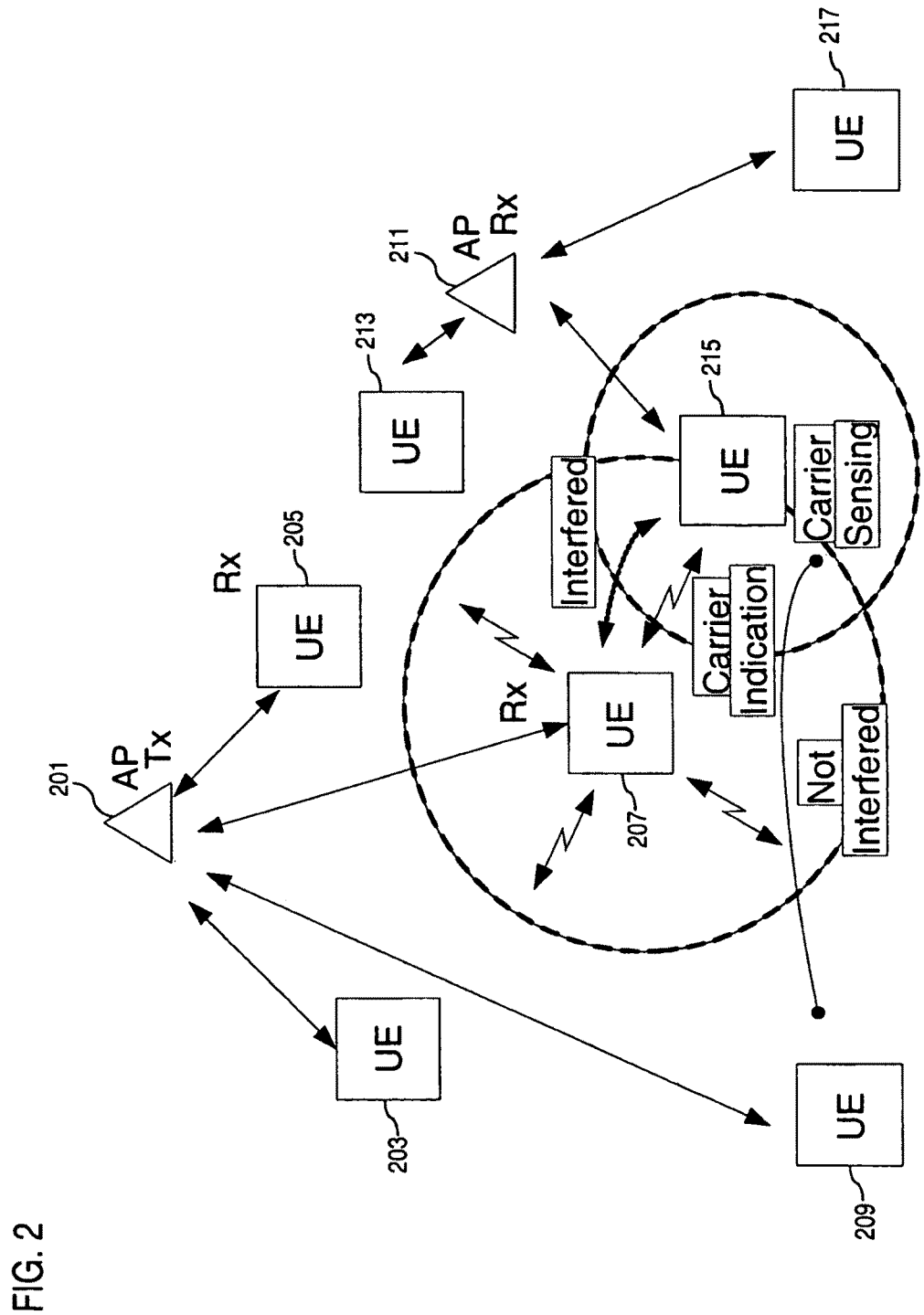
FIG. 2 is a diagram of an exemplary system including interfering user equipment, in accordance with an embodiment of the invention.

FIG. 2 is a diagram of an exemplary system including interfering user equipment, in accordance with an embodiment of the invention. As mentioned, a CI-channel can signal information about, for example, strong interfered resources to neighboring nodes within a neighborhood. The level of interference, in an exemplary embodiment, can be pre-determined using a thresholding mechanism. As shown, AP 201 serves UEs 203-209, while AP 211 is the serving node for UEs 213-217. In this example, UE 207 (served by AP 201) transmits CI information to its neighborhood, which includes UE 215. The UE 215 (served by AP 211) has a sufficient Signal to Interference plus Noise Ratio (SINR) of the received CI-channel transmitted by the neighboring UE 207. Hence, the UE 215 can sense the transmission of UE 207 and interpret the CI signaling (i.e., interference information). As such, the UE 215 may detect coded information of the allocations and/or interference experienced by UE 207, which originated transmission of the CI-channel.

For any other neighbor node (e.g., UE 209) that is not able to detect the CI-channel transmitted by UE 207, the allocation and interference experience is not available. However, this is of no concern as that information from UE 207 does not have any relevance for UE 209; namely, the propagation distance between UE 207 and UE 209 is sufficiently large for these neighbor nodes to experience interference independently. Thus, UE 209 is not able to detect and decode "dis-information" (outside of its coverage area). This approach provides coordination of the resource allocations as to minimize the interference between UE 207 and UE 215 within their respective serving cells.

In addition to the interference coordination between the transmissions of UE 207 to and from AP 201, such coordination is performed for transmissions between UE 215 and AP 211 as well. According to one embodiment, a scheduler (or resource allocation logic) of the serving AP (e.g., AP 201) is primarily responsible for these transmissions. In this example, UE 209 transmits the CI information, which is not detected by UE 215, because UE 215 is not in within the sensing neighborhood of UE 209. As such, there is no interference coordination between the transmissions for UE 209 and UE 215; and their allocations may reuse the same time-frequency resources freely.

Figure 3:
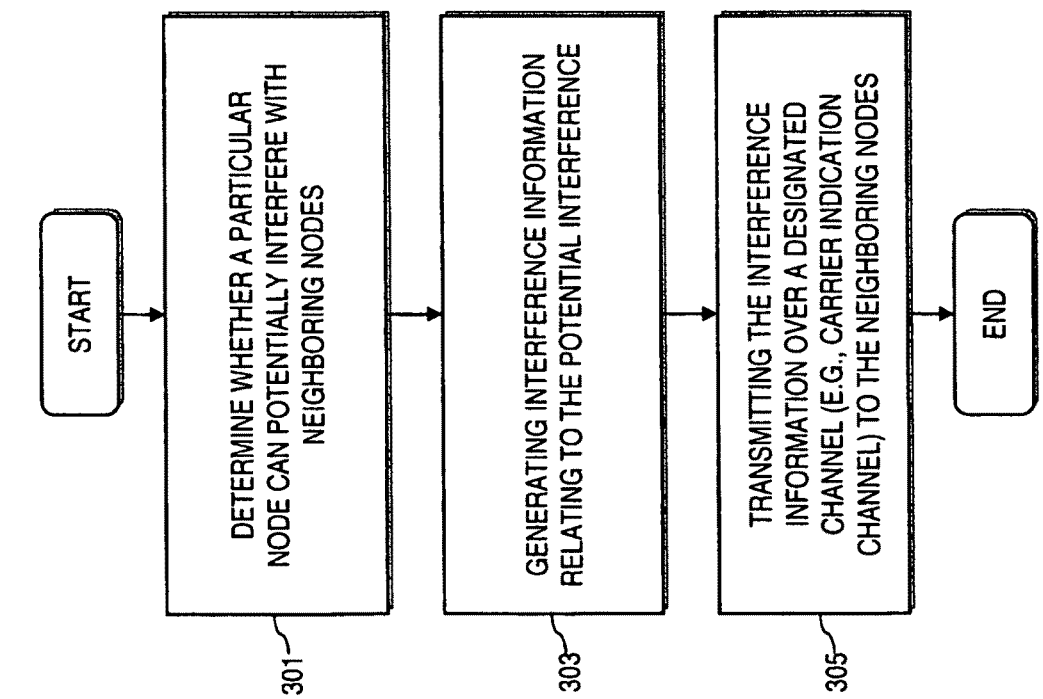
FIG. 3 is a flowchart of a carrier indication process, in accordance with an embodiment of the invention.

FIG. 3 is a flowchart of a carrier indication process, in accordance with an embodiment of the invention. This process is explained with respect to the system of FIG. 1. Carrier indication (CI) provides the capability of a network node (e.g., a UE, a terminal, base station, etc.) to inform its neighborhood about its interference creation. This information may indicate that the particular terminal will create interference to known resources (in the near present or the future), or may indicate, as mentioned, deterministic allocations in the area (e.g., after decoding the allocation table of the serving network node, i.e., access point). This "interfered", resource information can include, for example, time-frequency- and/or channelization code information or a combination thereof. According to one embodiment, time may refer to a slot, a zone, an atom, a sub-frame, a frame or a hyper-frame, and frequency may refer to a sub-carrier, a resource element, a zone, an atom, a physical resource block, or to frequency localized resources or frequency distributed resources. The channelization code resource may, for example, refer to a sounding signal, a tone, a spreading code or a spatial weight vector.

According to one embodiment, the CI-channel can be configured in a manner similar to random access channel, but with its own physical resources. The random access resources can be configurable per cell by an operator, for instance; this type of configurability can be provided to the CI-channel. Thus, carrier sensing carrier indication in its simplest form may comprise a RACH-like procedure between the network nodes (any of UE-UE, UE-AP).

As seen in FIG. 1, the UE 101 determines whether it can potentially be a source of interference with one or more neighboring nodes, per step 301. Under this scenario, the neighboring nodes of UE 101 include the UE 103 and the AP 107. Using the carrier indication module 101a, the UE 101 generates, as in step 303, interference information relating to the potential interference with its neighbors. This interference information is then signaled, per step 305, via the carrier indication channel 111 to the neighborhood—i.e., the UE 103 and the AP 107, which senses the channel 111 and obtains the interference information.

Figure 4A:
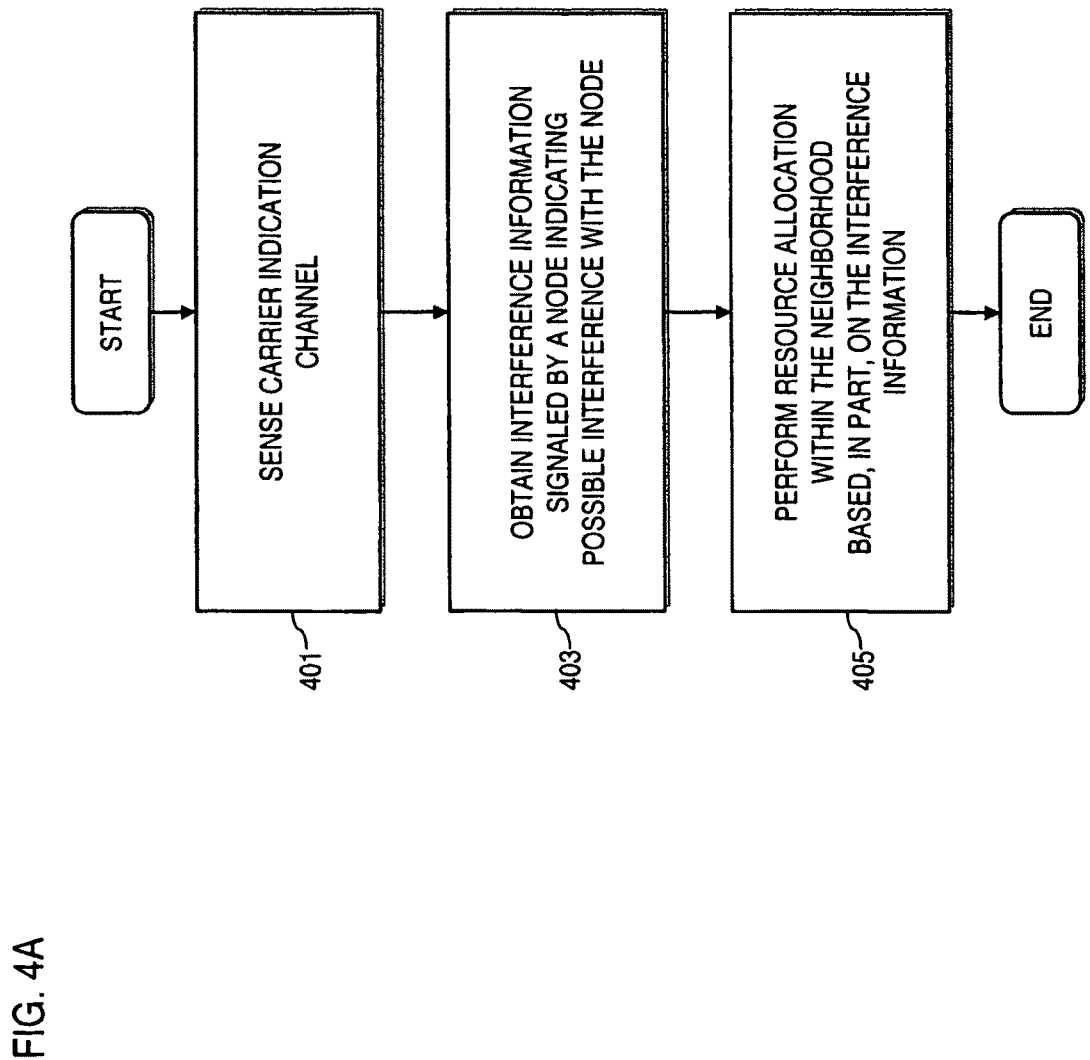
FIGS. 4A-4C are flowcharts of processes relating to carrier sensing, in accordance with various embodiments of the invention.
Figure 4B:
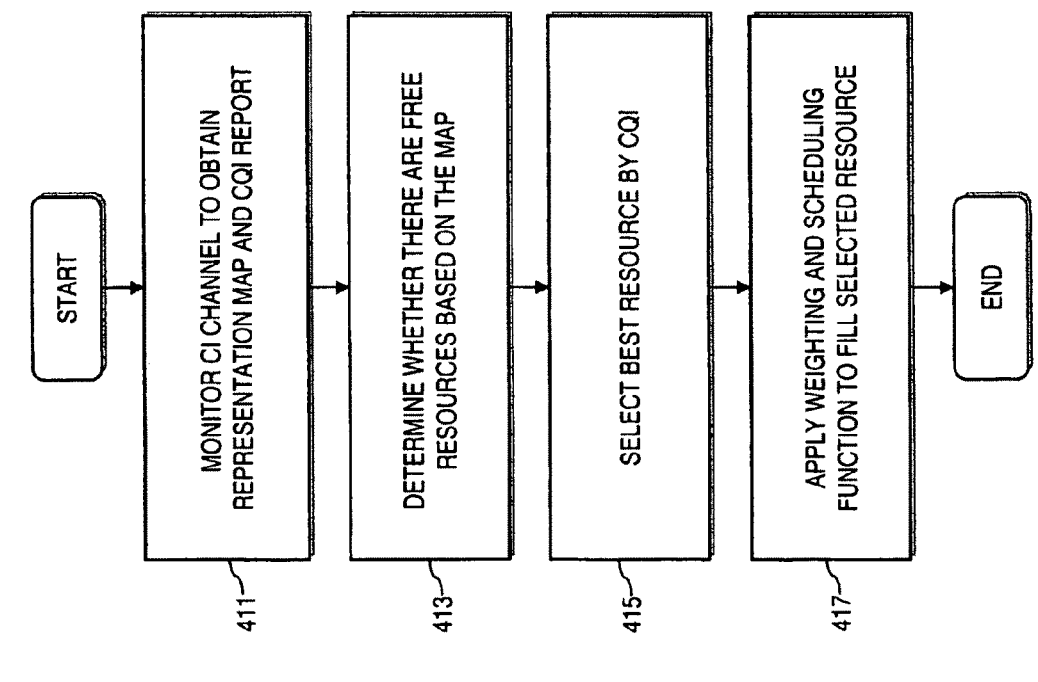
Figure 4C:
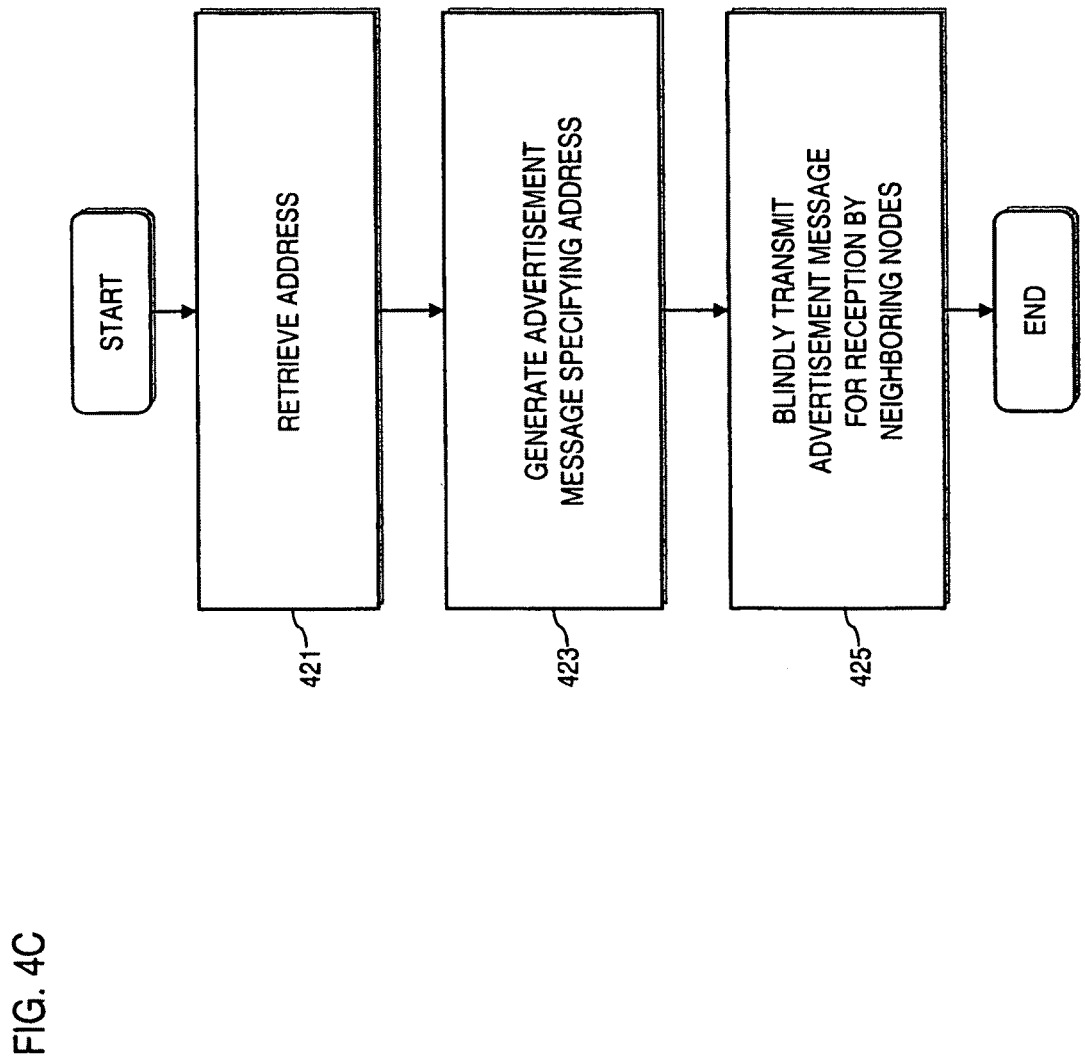

FIGS. 4A-4C are flowcharts of processes relating to carrier sensing, in accordance with various embodiments of the invention. Carrier sensing (CS) functionality refers to a network node's (e.g., terminal, UE, AP, etc.) capability to detect the CI-signal created by another network node (e.g., another terminal, UE, AP, etc.) operating in the common neighborhood. In an exemplary embodiment, a neighborhood can be characterized as a detectable Signal to Interference plus Noise Ratio (SINR) regime of the CI channel. The neighborhood is dependent on the CI transmission technology (e.g., sequence transmission or code block transmission may have different coverage). Thus, carrier sensing involves the detection of the CI information, which is, e.g., a physical signal waveform, a code block with single bit information, a code block with map information or a code block of two-dimensional spread sequences.

Continuing with the example of FIG. 3, in step 401 (shown in FIG. 4A), the UE 103 senses the CI channel 111. By decoding the CI channel 111, the UE 103 obtains the interference information that was signaled by the UE 101 (step 403). In step 405, resource allocation within the neighborhood can be performed by the AP 107 based on the interference information.

The CI channel 111 can be implemented in a variety of ways. For instance, the CI channel 111 may be a physical signal waveform (which, e.g., does not carry other information than what the sequence index may itself indicate). In another embodiment, the channel 111 is represented by a single bit busy burst, whose detection can be sufficient to alert whether the CI-channel transmitter is creating interference (transmitting) in that time-slot or not. Another form of the CI-channel can be a code-block, which carries information-map about the allocation and/or interference experience in time and frequency domain with a defined time-frequency resolution. Additionally, the CI-channel 111 can be a code block, repetition coded and spread to a physical sequence.

In yet another embodiment, the CI-channel 111 is represented by a code block, repetition coded and spread to a physical sequence. By way of example, the frequency spreading can be any type: Zadoff-Chu, Cazac, Local-Area Synchronized, Gold, Walsh, Fourier, etc. Time domain spreading can be of type block spreading, e.g., Hadamard, or rotated Fourier spreading. As another example, Walsh codes may be used.

In one embodiment, the reporting resolution (e.g., time/frequency/code) of the CI-channel 111 may be pre-defined or be signaled as a network wide parameter. Another alternative is to apply a self-scaling map format, which includes indications of the resolution of the map and the contents of the map itself. The size and resolution of the map can be specified inside the payload of a message.

FIG. 4B shows a resource allocation process, according to one embodiment. As evident from the prior discussions, any transmitter (UE or AP), having the intention to transmit, decodes the CI-channel of the other UEs in its neighborhood. Prior to transmission in the scheduled resources, the UE 103 monitors, as in step 411, the CI-channel to determine whether the resources are indeed available. If the channel is free, the UE 103 may transmit and include, for example, a channel quality indicator (CQI) report in the transmission. In addition, the UE 103 may optionally include a reservation map that is decoded from the CI-channel 111 to inform the serving access point 107 of this information. In an exemplary embodiment, the map is available only from those CI-channels that are received with adequate signal strength to detect the encoded information. For other CI channels, the map is not available and is not needed because the interference distance is sufficiently large.

A scheduler (or resource allocation logic 107a) of the AP 107 can then use the maps, observed by different UEs that it is serving, and the CQI information to allocate resources. This process is as follows. First, the process checks whether there are free resources in the map (step 413). Next, the best resource is selected by CQI, per step 415. Thereafter, the process applies a weighting and scheduling function to fill the resources, per step 417. The map may include, in an exemplary embodiment, differentiation of free, reserved, mildly interfered resources, or just solely reserved resources.

It is noted that under certain circumstances, the map and CQI reports can be continuously changing. In this instance, the following process is followed. The best-M reports (M being 2, 3, 4, . . . , 10, for example) are reported; they are reserved in order and written to the map.

The AP 107 can schedule by an algorithm (e.g., RR, PF, CDS, etc.) in the order of M. In one embodiment, the AP 107 schedules resources in decreasing order of increasing interference gradient, or checking interference contours. By way of example, in an interference contour algorithm, the worst top interferers are signaled first and with higher accuracy, the second stronger interferers are signaled next with less accuracy, etc.; and the interference floor is signaled and averaged over large time-frequency units. According to an exemplary embodiment, thresholds and windows for these measures can be set.

If the UE 103 has knowledge of the map of its most severe interferers and CQI, the AP 107 can select the best resources based on this map.

In an exemplary embodiment, the CQI can be measured by the UE 103 from the AP frequency resources—i.e., one report per frame observed from all available downlink reference sequences and reported in frequency selective manner. The reporting resolution can be determined in the number of physical resource blocks (PRBs), for instance.

According to one embodiment, the allocation map can include uplink UE originated transmission map and the downlink map joint coding of downlink allocations enable ease of creation and reflection of the downlink allocation map.

These CI maps can also specify the exact interference scenarios: AP-AP case, UE-UE case, AP-UE case, and UE-AP case. The AP 107 (via a scheduler or resource allocation logic 107a) performs the selections. However, by the map, the selection need not be global, but can be based on the measured interference observations from the UEs.

AP-AP interference (e.g., APs 107 and 109) is a more severe case, especially if the interference corrupts critical control information, such as pilot symbols for synchronization. Pilots can be frequency offset between the neighboring cells in a single operator network.

In the case where there is no serving AP, then the UEs handle the map for both link directions. The UEs that seek to communicate make the decision regarding which resources to use and to which link direction at each time.

FIG. 4C shows a node advertising process, according to one embodiment. As mentioned, the described processes of carrier sensing and carrier indication can be implemented independently and in combination. In other words, the sensing operation can be performed without the indication function. For example, the individual indication operation can be executed without interference information for forming a neighborhood; this can be accomplished through blind advertising by a node of its existence. In step 421, the node can retrieve its own address. Thereafter, an advertisement message is generated to specify the address, per step 423. Thereafter, the node can blindly send the advertisement message to the neighboring nodes, as in step 425.

According to one embodiment, however, the functions of carrier sensing and carrier indication are utilized in conjunction such that the sensing information may act as an input (among other input) to the indication channel.

To further illustrate the above processes of FIGS. 3 and 4A and 4B, another exemplary interference scenario is described.

Figure 5:
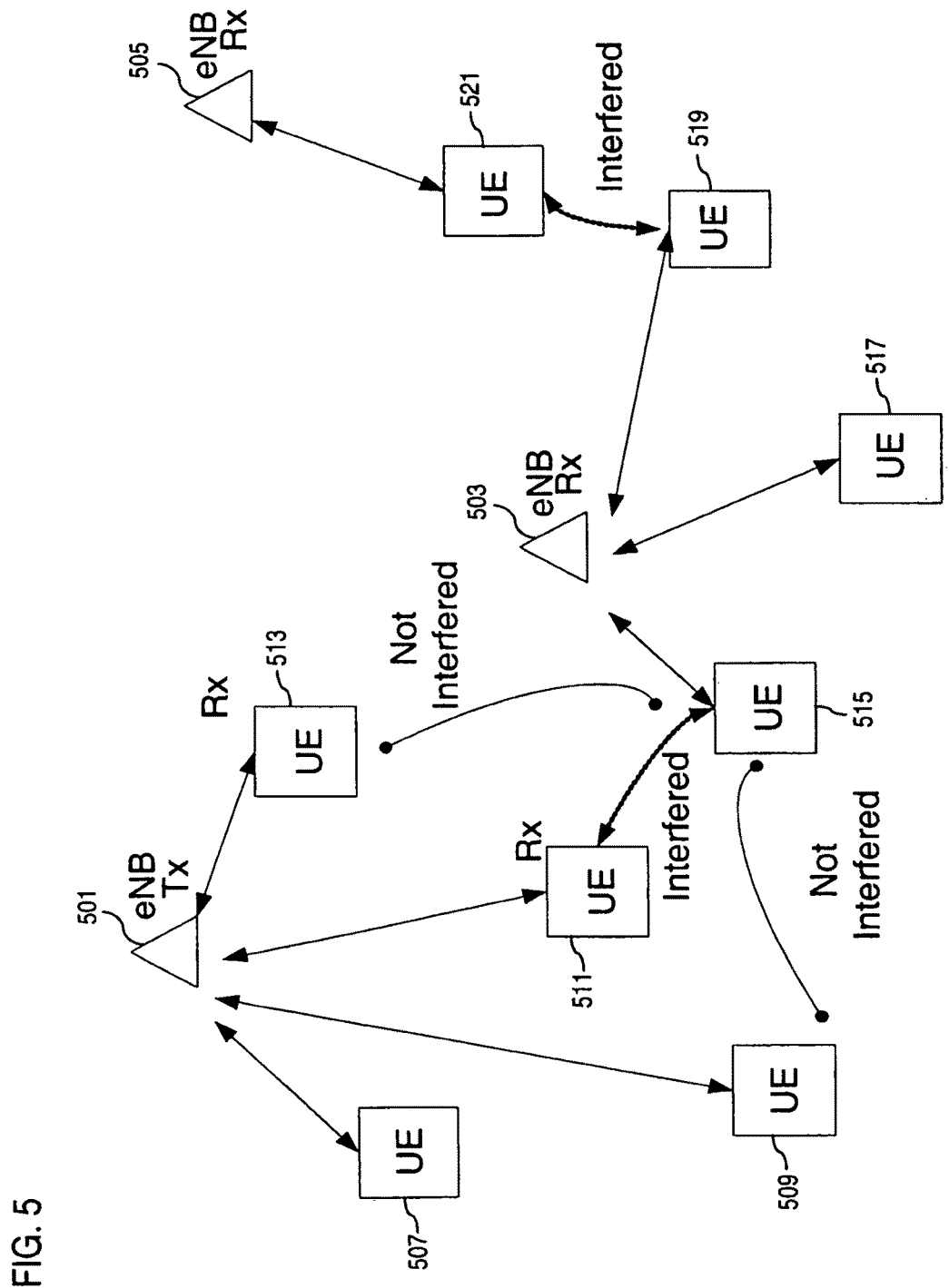
FIG. 5 is a diagram of an exemplary system involving uncoordinated deployment, in accordance with an embodiment of the invention.

FIG. 5 is a diagram of an exemplary system involving uncoordinated deployment, in accordance with an embodiment of the invention. Under this exemplary scenario, base stations 501-505 (e.g., eNBs) are provided. The eNB 501 serves UEs 507-513, and the eNB 503 acts as the serving base station to UEs 515-519. Moreover, the eNB 505 is the serving base station to UE 521. As shown, the UE 511 and UE 515 are interfering, as well as the UE 519 and UE 521.

Tables 1-4 show carrier sensing (CS) observations of different UEs and their signaling in the CI-channel. It is noted that although the examples are rather elaborate (e.g., detailed maps in given resolution), simplifications can be made, from an efficiency standpoint. For example, such simplifications may include making the reporting resolution coarser, shortening the reporting information, and/or clustering the reporting information. The nomenclature for characterizing the nature of the interference, by way of example, is as follows: "1" is for experienced interference, "1(A)" is a channel reservation by allocation of node 1 (eNB 501), "1(B)" is a channel reservation by node 2 (eNB 503), and "1(C)" is a channel reservation by node 3 (eNB 505). Also, free resources are marked by "0" or replaced in the tables by a blank entry.

In Table 2, "1(A)" indicates that an allocation by eNB 501 is experienced as interference or as a reserved channel for UE 515 served by eNB 503. The marking "0(A)" simply provides a placeholder in the tables showing that allocation A by eNB 501 does not interfere with the operation of UE 519 (served by eNB 505) due to a sufficiently large propagation distance. In certain embodiments, it may not be necessary to have separate indication for different interference sources, and thus, the labels of "1" and "0" are sufficient.

Table 1 shows the allocations and interference observations of UE 511 served by eNB 501, wherein 1(A) is an allocated resource, and "1" is an interfered resource. In addition, 1 (A11) refers that the reservation by node 1 (eNB 501) is for an UL allocation to the UE 511 itself.

TABLE 1

|   |   |   |   |   |   |   |   |   |   | 1 (A) | 1 (A) |
|---|---|---|---|---|---|---|---|---|---|---|---|
|   | 1 (A) |   |   |   |   |   | 1 (A) | 1 (A) | 1 (A) | 1 (A) | 1 (A) |
|   |   |   |   |   |   |   | 1 (A) | 1 (A) | 1 (A) | 1 (A) | 1 (A) |
| 1 |   |   |   |   |   |   | 1 (A) | 1 (A) | 1 (A) |   |   |
|   | 1 |   |   |   |   |   |   | 1 (A) |   |   |   |
|   |   |   |   |   |   |   |   |   | 1 (A) |   |   |
| 1 (A) |   |   | 1 |   |   |   |   |   |   |   | 1 (A) |
|   |   |   | 1 (A) |   |   |   | 1 (A) | 1 (A) | 1 (A) | 1 (A) | 1 (A) |
|   | 1 (A) |   |   |   |   |   | 1 (A) | 1 (A) | 1 (A) | 1 (A) | 1 (A) |
|   |   | 1 (A11) | 1 (A11) |   | 1 (A11) |   |   |   |   |   |   |
|   |   |   |   |   |   |   | 1 (A) |   |   |   |   |
|   |   |   |   |   |   |   | 1 (A) |   | 1 (A) | 1 (A) |   |
|   |   |   |   |   |   |   |   |   |   | 1 (A) | 1 (A) |
|   |   |   |   | 1 (A) |   |   |   |   |   |   |   |

The allocation map in this example forms a vector of signaling words W(i), where the first 3 words are as follows:

W(0)=[0 0 0 0 0 0 0 1 1]
W(1)=[0 0 0 0 0 0 0 0 0]
W(2)=[0 0 1 0 0 0 1 1 1 1]

The map (M) in this example is a matrix of words w(0) . . . w(N) as:

$$M = \begin{bmatrix} 0 & 0 & 0 & 0 & 0 & 0 & 0 & 1 & 1 \\ 0 & 0 & 0 & 0 & 0 & 0 & 0 & 0 & 0 \\ 0 & 0 & 1 & 0 & 0 & 1 & 1 & 1 & 1 \\ 0 & 0 & 0 & 0 & 0 & 1 & 1 & 1 & 1 \\ 1 & 0 & 0 & 0 & 0 & 1 & 1 & 1 & 0 \\ 0 & 1 & 0 & 0 & 0 & 0 & 1 & 0 & 0 \\ 0 & 0 & 0 & 0 & 0 & 0 & 0 & 1 & 0 \\ 1 & 0 & 0 & 1 & 0 & 0 & 0 & 0 & 1 \\ 0 & 0 & 0 & 1 & 0 & 0 & 1 & 1 & 1 \\ 0 & 0 & 1 & 0 & 0 & 1 & 1 & 1 & 1 \\ 0 & 0 & 0 & 1 & 1 & 1 & 0 & 0 & 0 \\ 0 & 0 & 0 & 0 & 0 & 0 & 1 & 0 & 0 \\ 0 & 0 & 0 & 0 & 0 & 1 & 1 & 1 & 0 \\ 0 & 0 & 0 & 0 & 0 & 0 & 0 & 1 & 1 \\ 0 & 0 & 0 & 0 & 0 & 0 & 0 & 0 & 0 \\ 0 & 0 & 0 & 0 & 1 & 0 & 0 & 0 & 0 \end{bmatrix}$$

In accordance with one embodiment, the UE needs to report only its own channel reservation to its neighbors. As such, it is sufficient for UE 511 to signal word w(10) in this example for uplink purposes; however, the full matrix is needed to inform the downlink transmissions as they interfere equally despite the target terminal. The downlink information that the UE may obtain by decoding the commonly available downlink allocations (i.e., allocation table) by the eNB. Thus the allocations may be signaled, e.g., by the following:

$$\text{Uplink } (w10') = [0\ 0\ 0\ 1\ 1\ 1]$$

$$\text{Downlink } M = \begin{bmatrix} 0 & 0 & 1 & 1 \\ 0 & 0 & 0 & 0 \\ 1 & 1 & 1 & 1 \\ 1 & 1 & 1 & 1 \\ 1 & 1 & 1 & 0 \\ 0 & 1 & 0 & 0 \\ 0 & 0 & 1 & 0 \\ 0 & 0 & 0 & 1 \\ 1 & 1 & 1 & 1 \\ 1 & 1 & 1 & 1 \\ 0 & 0 & 0 & 0 \\ 1 & 0 & 0 & 0 \\ 1 & 1 & 1 & 0 \\ 0 & 0 & 1 & 1 \\ 0 & 0 & 0 & 0 \\ 0 & 0 & 0 & 0 \end{bmatrix}$$

In an exemplary embodiment, the eNB can mask the downlink allocations in a UE specific way, whereby the UE may just be aware of its own downlink allocations and could report them in the CI-channel. Another minimization can involve signaling of the common downlink-uplink resource switching point(s), as to convey critical information to a victim node in the neighborhood (i.e., node that is negatively impacted by the interference).

Table 2 shows the allocations and interference observations of UE 513 served by eNB 501, wherein 1(A) is an allocated resource and "1" is an interfered resource.

TABLE 2

|      |      |      |      |      |      |      | 1 (A) | 1 (A) |
| ---- | ---- | ---- | ---- | ---- | ---- | ---- | ----- | ----- |
|      | 1 (A) |     |      |      | 1 (A) | 1 (A) | 1 (A) | 1 (A) |
|      |      | 1    |      |      | 1 (A) | 1 (A) | 1 (A) | 1 (A) |
|      |      |      | 1    |      | 1 (A) | 1 (A) | 1 (A) |       |
|      |      |      |      | 1    |      | 1 (A) |       |       |
|      |      |      |      |      |      |      | 1 (A) |       |
| 1 (A) |     |      |      |      |      |      |       | 1 (A) |
|      |      | 1 (A) |    |      | 1 (A) | 1 (A) | 1 (A) | 1 (A) |
|      | 1 (A) |     |      |      | 1 (A) | 1 (A) | 1 (A) | 1 (A) |
|      |      | 1 (A) | 1 (A) | 1 (A) |   |      |       |       |
|      |      |      |      |      |      | 1 (A) |       |       |
|      |      | 1    |      |      | 1 (A) | 1 (A) | 1 (A) |       |
|      | 1    |      |      |      |      |      | 1 (A) | 1 (A) |
|      |      |      | 1 (A) |     |      |      |       |       |

The example provided in Table 3 shows the allocations and interference observations of UE 515 served by eNB 503; 1(B) is an allocated resource by eNB 503, and "1" is an interfered resource. 1(A) denotes reserved resource from eNB 501 indicated by UE 511 to UE 515 in the CI-channel. 0(A) is a reserved resource from eNB 501, but does not interfere with communications of UE 515 and eNB 503 and appears as free.

TABLE 3

|       |       |       | 1 (B) | 1 (B) | 1 (B) | 1 (B) | 1 (B) | 1 (B) |
|       |       |       | 1 (B) | 1 (B) | 1 (B) | 1 (B) | 1 (B) | 1 (B) |
|       |       | 0 (A) | 1 (B) | 1 (B) | 1 (B) | 1 (B) | 1 (B) | 1 (B) |
|       |       |       |       |       | 1 (B) | 1 (B) | 1 (B) | 1 (B) |
| 1     |       |       |       | 1 (B) | 1 (B) | 1 (B) |       |       |
|       | 1     |       | 1 (B) | 1 (B) |       | 1 (B) |       |       |
|       |       |       | 1 (B) | 1 (B) |       |       | 1 (B) |       |
| 0 (A) |       | 1     |       |       |       |       |       | 1 (B) |
|       |       | 0 (A) |       |       | 1 (B) | 1 (B) | 1 (B) | 1 (B) |
|       | 0 (A) |       |       |       | 1 (B) | 1 (B) | 1 (B) | 1 (B) |
|       |       | 1 (A) |       |       |       |       |       |       |
| 1     | 1     |       |       |       | 1 (B) |       |       |       |
| 1     | 1     | 1 (B) | 1 (B) |       | 1 (B) | 1 (B) | 1 (B) |       |
|       |       |       |       |       |       |       | 1 (B) | 1 (B) |
| 1 (B) | 1 (B) | 1 (B) | 1 (B) | 1 (B) | 1 (B) | 1 (B) | 1 (B) | 1 (B) |
| 1 (B) | 1 (B) | 1 (B) | 1 (B) | 1 (B) | 1 (B) | 1 (B) | 1 (B) | 1 (B) |

In Table 4, the allocations and interference observations of UE 521 served by eNB 505 are shown. 1(C) is an allocated resource by eNB 505, and "1" is an interfered resource. As with Table 3, 0(A) indicates a reserved resource from eNB 501 (but does not interfere with communications of UE 521 and eNB 505 and appears as free). 1(B) is an allocated resource for UE 515 by eNB 503 indicated by UE 515 to UE 521 in the CI-channel. 0(B) specifies a reserved resource from eNB 503, and no interference with UE 521 and eNB 505 (and appears as free).

TABLE 4

|       |       |       |       | 1 (C) | 1 (C) | 1 (C) | 1 (C) | 1 (C) | 1 (C) |
|       |       |       |       | 1 (C) | 1 (C) | 1 (C) | 1 (C) | 1 (C) | 1 (C) |
|       |       | 0 (A) |       | 1 (C) | 1 (C) | 1 (C) | 1 (C) | 1 (C) | 1 (C) |
|       |       |       |       |       |       | 1 (C) | 1 (C) | 1 (C) | 1 (C) |
| 0 (A) |       |       |       |       |       | 1 (C) | 1 (C) | 1 (C) |       |
|       | 0 (A) |       |       | 1 (C) | 1 (C) |       | 1 (C) |       |       |
|       |       |       |       | 1 (C) | 1 (C) |       |       | 1 (C) |       |
| 1 (C) | 1 (C) | 1 (C) | 1 (C) |       |       |       |       |       | 1 (C) |
| 1 (C) | 1 (C) | 1 (C) | 1 (C) |       |       | 1 (C) | 1 (C) | 1 (C) | 1 (C) |
| 1 (C) | 1 (C) | 1 (C) | 1 (C) |       |       | 1 (C) | 1 (C) | 1 (C) | 1 (C) |
| 1 (C) | 1 (C) | 1 (C) | 1 (C) |       |       |       |       |       |       |
|       |       |       |       |       |       | 1 (C) |       |       |       |
|       |       | 0 (B) | 0 (B) |       |       | 1 (C) | 1 (C) | 1 (C) |       |
|       |       |       |       |       |       |       |       | 1 (C) | 1 (C) |
| 1 (B) | 1 (B) | 0 (B) | 0 (B) | 1 (C) | 1 (C) | 1 (C) | 1 (C) | 1 (C) | 1 (C) |
| 1 (B) | 1 (B) | 0 (B) | 0 (B) | 1 (C) | 1 (C) | 1 (C) | 1 (C) | 1 (C) | 1 (C) |

It is noted that signaling the carrier indication information can consume a relatively large number of bits (and therefore bandwidth). However, in a wideband transmission, the transmission capacity is not as much signaling bit-limited than it is of colliding-interference limited. Therefore, even the use of lengthy codewords for signaling may be justified, if interference and collisions can thus be reduced.

Figure 6B:
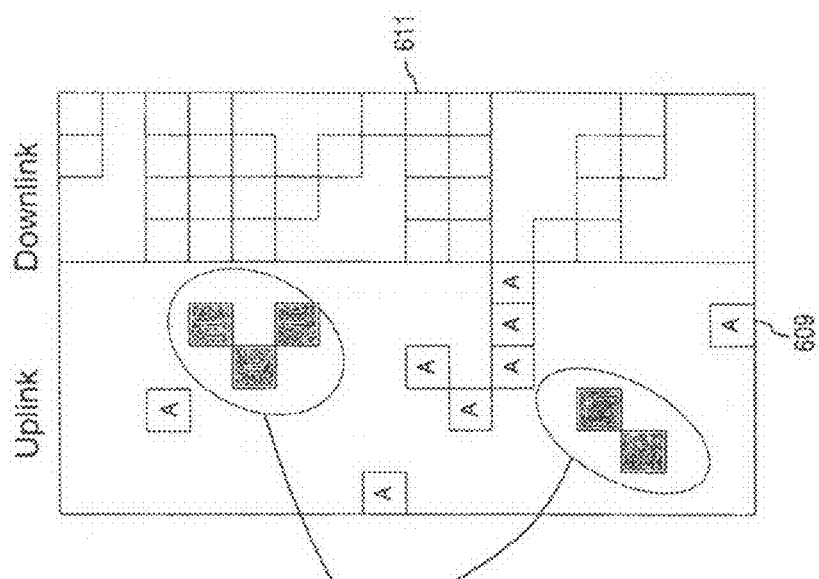
FIGS. 6A-6D are diagrams of various interference observations pertaining to the system of FIG. 5, according to various exemplary embodiments of the invention.
Figure 6A:
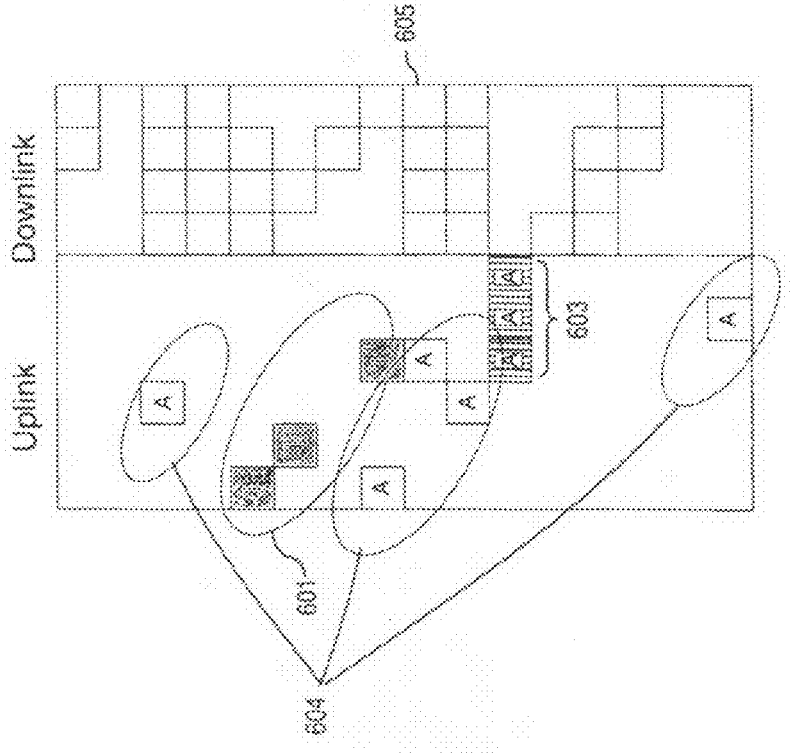

FIGS. 6A-6D are diagrams of various interference observations pertaining to the system of FIG. 5, according to various exemplary embodiments of the invention. The system enables IMT-A network nodes (LTEs and APs) to adapt the network locally and find a SINR regime, where the network becomes operable. The approach, according to certain embodiments, provides local optimization through observations in a—neighborhood. Interference observations by UE 511 (FIG. 6A) and UE 513 (FIG. 6B), which are served by eNB 501 in the system of FIG. 5. In FIG. 6A, an interference region 601 is denoted by "i", and uplink allocations 603 for UE 511 are illustrated. In addition, UE 511 knows about the uplink allocations 604 by the eNB 501. Downlink allocations 605 are also shown.

With respect to FIG. 6B, the UE 513 observes two interference regions 607. The resources are allocated as follows: uplink allocations 609 and downlink allocations 611.

Figure 6D:
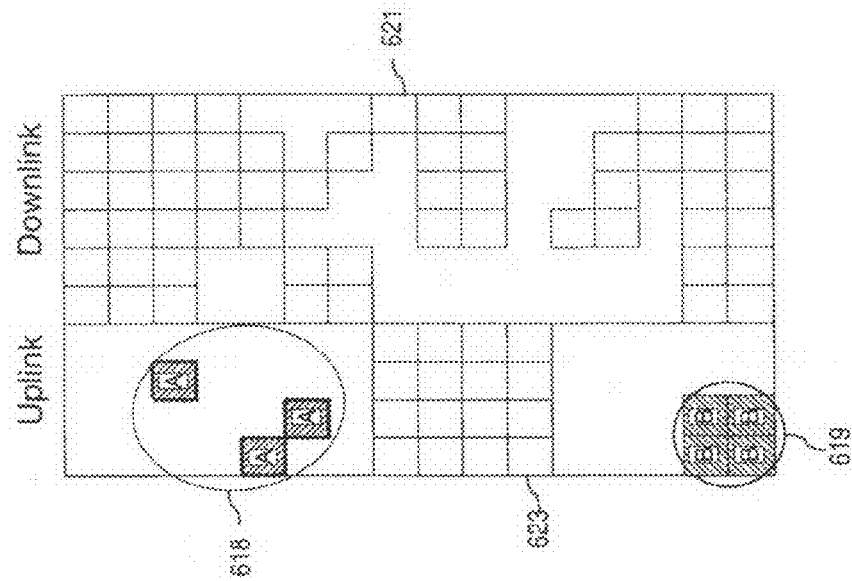
Figure 6C:
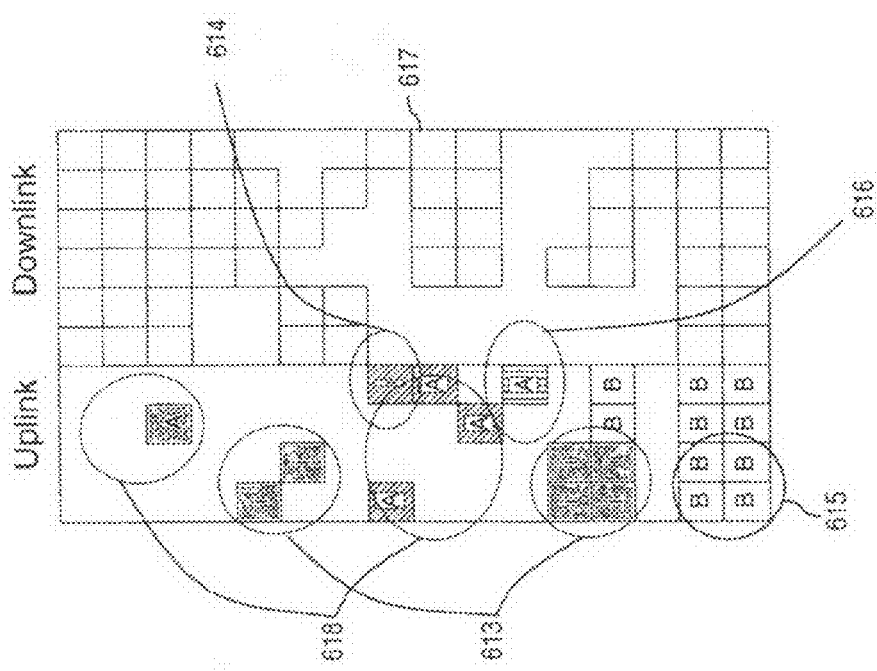

FIG. 6C illustrates the interference observations by UE 515 (served by eNB 503), and FIG. 6D shows the interference observations by UE 519 (served by eNB 505). In FIG. 6C, the UE 515 observes interferences 613; the eNB 503 allocated uplink resources 615 and downlink resources 617. Also, UE 515 is aware of the interference observation 614 indicated by UE 511, as well as the uplink allocations 618 of eNB 501 and the uplink allocation 616 specifically for the interfering UE 511. All this information may be reflected on a CI channel transmitted by UE 515, or may be conveyed to the eNB 515 to form a basis for future channel allocations. The eNB 505 provides uplink allocations 619 and downlink allocations 621, as seen in FIG. 6D; in addition, UE 521 knows about the uplink allocations 618 of eNB 501, and the uplink allocations 619 of eNB 503.

Figure 7:
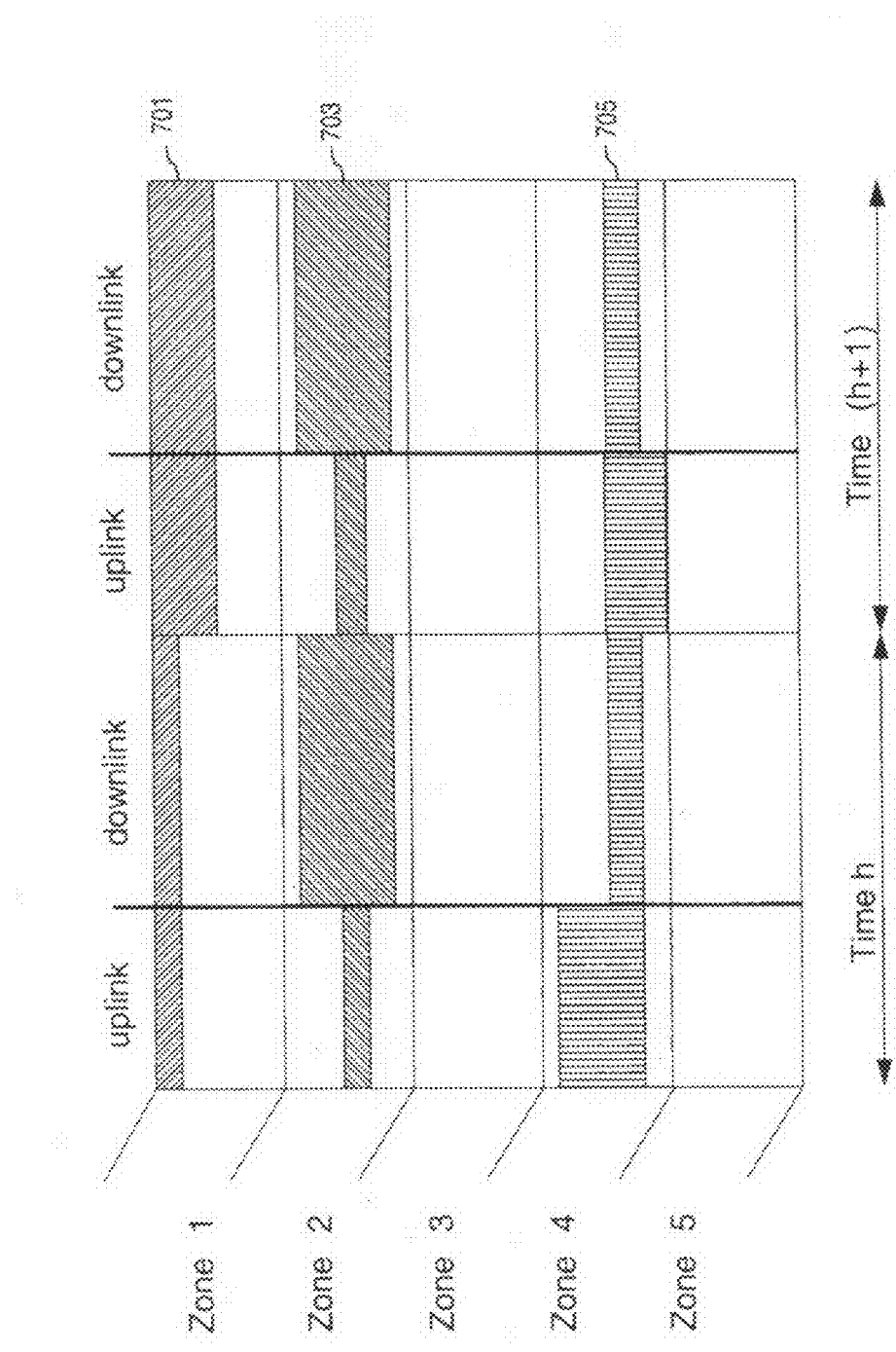
FIG. 7 is a diagram of allocation zones used to optimize channel indication signaling, according to an embodiment of the invention.

FIG. 7 is a diagram of allocation zones used to optimize channel indication signaling, according to an embodiment of the invention. It is noted that optimization of CI-signaling can be attained by simply indicating an allocation zone (without precise resource allocation information). Under this approach, time-frequency allocations are divided into large zones of resources. The UE (e.g., UE 101 of FIG. 1) can merely signal the time-frequency zone, where the actual allocations may be located. In this way, the neighbors may coordinate that their allocations would not appear in the same frequency zones at the same time. Avoiding the interfering zones will still permit the scheduler to make frequency selective allocations freely inside the zone. In a wideband transmission, as IMT-A, the operation bandwidth may be divided to fairly large frequency zones without performance degradation, as already inside each single one of the zones full frequency diversity is available. It is contemplated that the zones, according to various embodiments, may be orthogonal and non-overlapping in frequency or be partially overlapping.

Figure 8:
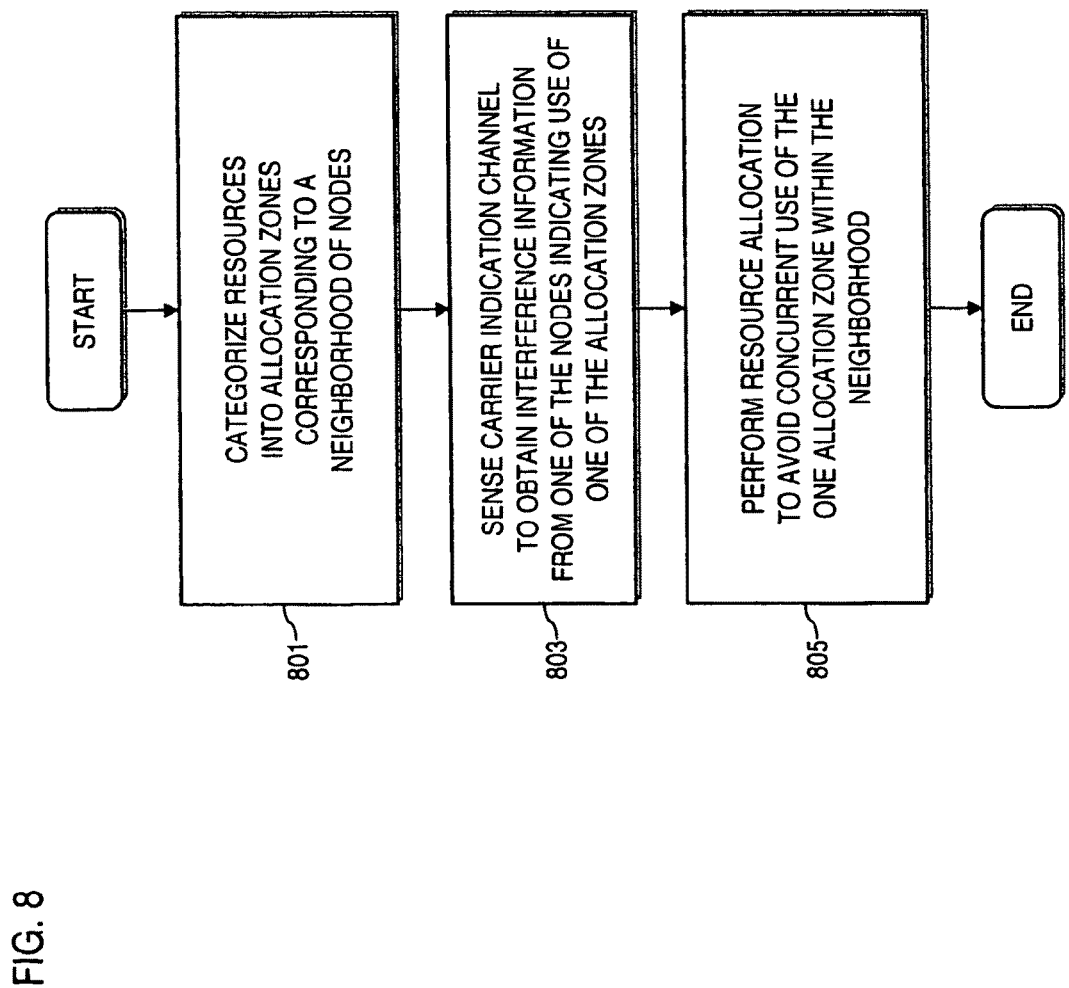
FIG. 8 is a flowchart of a process for optimizing channel indication signaling, according to an embodiment of the invention.

FIG. 8 is a flowchart of a process for optimizing channel indication signaling, according to an embodiment of the invention. In step 801, the resources are categorized into allocation zones: Zone 1. As seen in FIG. 7, the allocation 701 can be signaled to Zone 1, the allocation 703 to Zone 2, and the allocation 705 to Zone 4. In this manner, information about their exact resource allocations at a given time are not needed. The allocation 701 in Zone 1 is duplicated both in the uplink and the downlink from time (h) to time (h+1). The allocation 703 in Zone 2 remains constant for the uplink and the downlink. The allocation 705 in Zone 4 remains constant in resource size, but the uplink allocation has hopped to other frequency resources within the zone.

In step 803, the UE 101 can sense the carrier indication channel 111 to obtain interference information, which can specify allocation zones instead of detailed resource allocations (which entail greater overhead). The AP 107 can then perform allocation in a manner as to avoid concurrent use of the allocation zones based on the interference information (step 805).

As mentioned earlier, the overhead in signaling the carrier indication information can be substantial. The dimension of the code words in the worst case from one UE is the number of time timeslots for the allocation multiplied by the number of resource blocks—e.g., 10*50 bits for 10 MHz band and 5 kb/10 ms for 100 MHz band. The overhead can be reduced, in one embodiment, by separating the signaling of the uplink code words and the downlink code words. The uplink code word would then specify the active uplink code words, which are in use for this terminal itself (and omitting signaling all zeros for the other uplink resources). The downlink signaling code words can then indicate the downlink allocations for any terminal.

Further, the coding of time-frequency areas by more bit-efficient signaling words. These schemes can be reduced to report the worst-K as the highest observed busy-bits (where K is a parameter).

Various optimization mechanisms can be employed to minimize the size of the signaling map. For example, such mechanisms can include the following: bandwidth scaling of the map; resolution scaling of the map; windowing the map in time and frequency; coding of the map in transform domain (DCT); and color coding of the map. Discrete Cosine Transform (DCT) is an example of bit efficient coding, as it generates very short codewords (where a transient are not present). Other examples of coding and compression algorithms include Wavelet transforms, filterbank transforms, and Zak-transforms. Additionally, other optimized mechanisms can involve signaling of interfered resources by gradient or contour algorithms.

One of ordinary skill in the art would recognize that the processes for carrier indication and carrier sensing may be implemented via software, hardware (e.g., general processor, Digital Signal Processing (DSP) chip; an Application Specific Integrated Circuit (ASIC), Field Programmable Gate Arrays (FPGAs), etc.), firmware, or a combination thereof. Such exemplary hardware for performing the described functions is detailed below with respect to FIG. 9.

Figure 9:
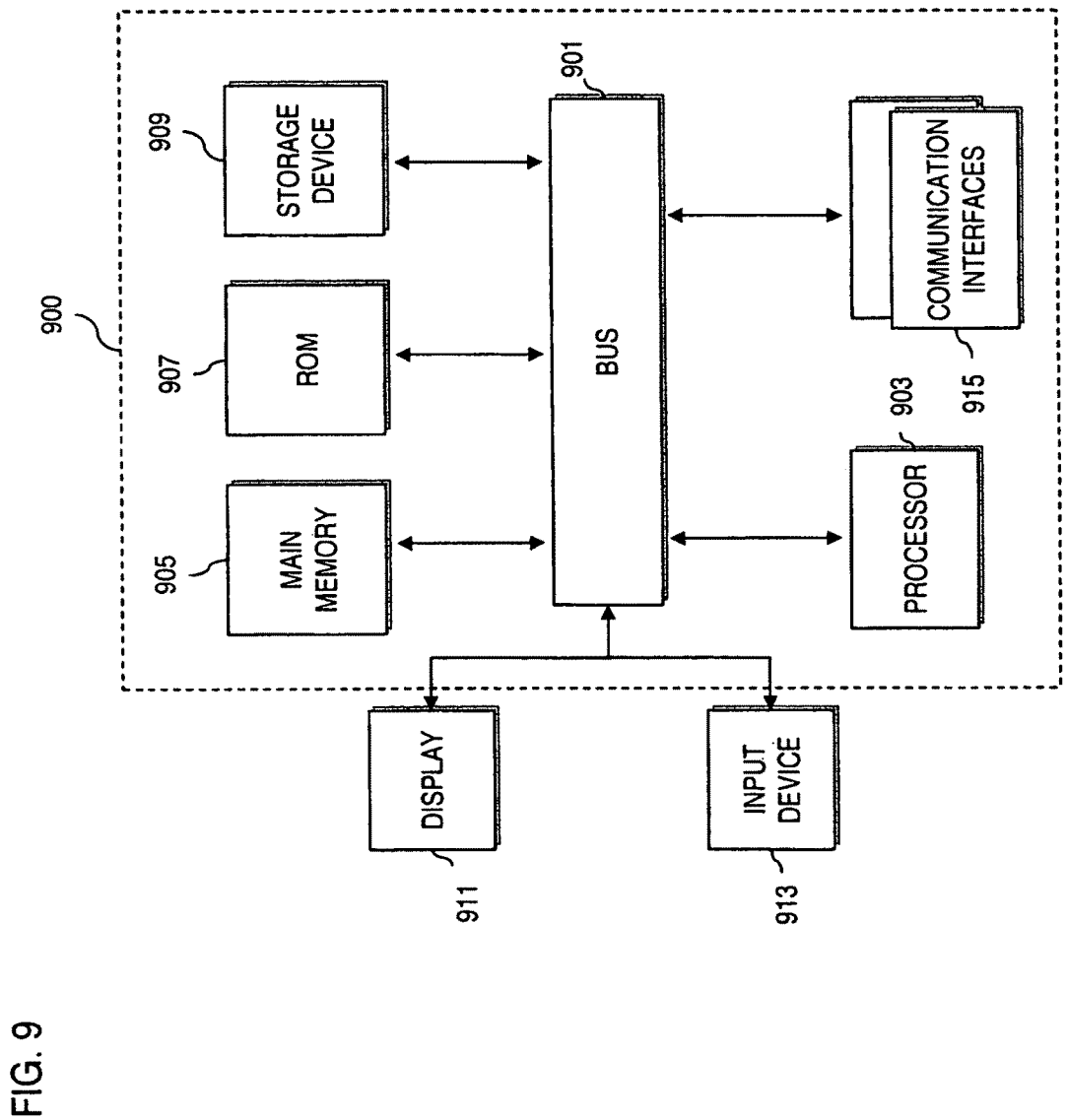
FIG. 9 is a diagram of hardware that can be used to implement an embodiment of the invention.

FIG. 9 illustrates exemplary hardware upon which various embodiments of the invention can be implemented. A computing system 900 includes a bus 901 or other communication mechanism for communicating information and a processor 903 coupled to the bus 901 for processing information. The computing system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computing system 900 may further include a read only memory (ROM) 907 or other static storage device coupled to the bus 901 for storing static information and instructions for the processor 903. A storage device 909, such as a magnetic disk or optical disk, is coupled to the bus 901 for persistently storing information and instructions.

The computing system 900 may be coupled via the bus 901 to a display 911, such as a liquid crystal display, or active matrix display, for displaying information to a user. An input device 913, such as a keyboard including alphanumeric and other keys, may be coupled to the bus 901 for communicating information and command selections to the processor 903. The input device 913 can include a cursor control, such as a mouse, a trackball, or cursor direction keys, for communicating direction information and command selections to the processor 903 and for controlling cursor movement on the display 911.

According to various embodiments of the invention, the processes described herein can be provided by the computing system 900 in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. In another example, reconfigurable hardware such as Field Programmable Gate Arrays (FPGAs) can be used, in which the functionality and connection topology of its logic gates are customizable at run-time, typically by programming memory look up tables. Thus, embodiments of the invention are not limited to any specific combination of hardware circuitry and software.

The computing system 900 also includes at least one communication interface 915 coupled to bus 901. The communication interface 915 provides a two-way data communication coupling to a network link (not shown). The communication interface 915 sends and receives electrical, electromagnetic, or optical signals that carry digital data streams representing various types of information. Further, the communication interface 915 can include peripheral interface devices, such as a Universal Serial Bus (USB) interface, a PCMCIA (Personal Computer Memory Card International Association) interface, etc.

The processor 903 may execute the transmitted code while being received and/or store the code in the storage device 909, or other non-volatile storage for later execution. In this manner, the computing system 900 may obtain application code in the form of a carrier wave.

The term "computer-readable medium" as used herein refers to any medium that participates in providing instructions to the processor 903 for execution. Such a medium may take many forms, including but not limited to non-volatile media, volatile media, and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the invention may initially be borne on a magnetic disk of a remote computer. In such a scenario, the remote computer loads the instructions into main memory and sends the instructions over a telephone line using a modem. A modem of a local system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
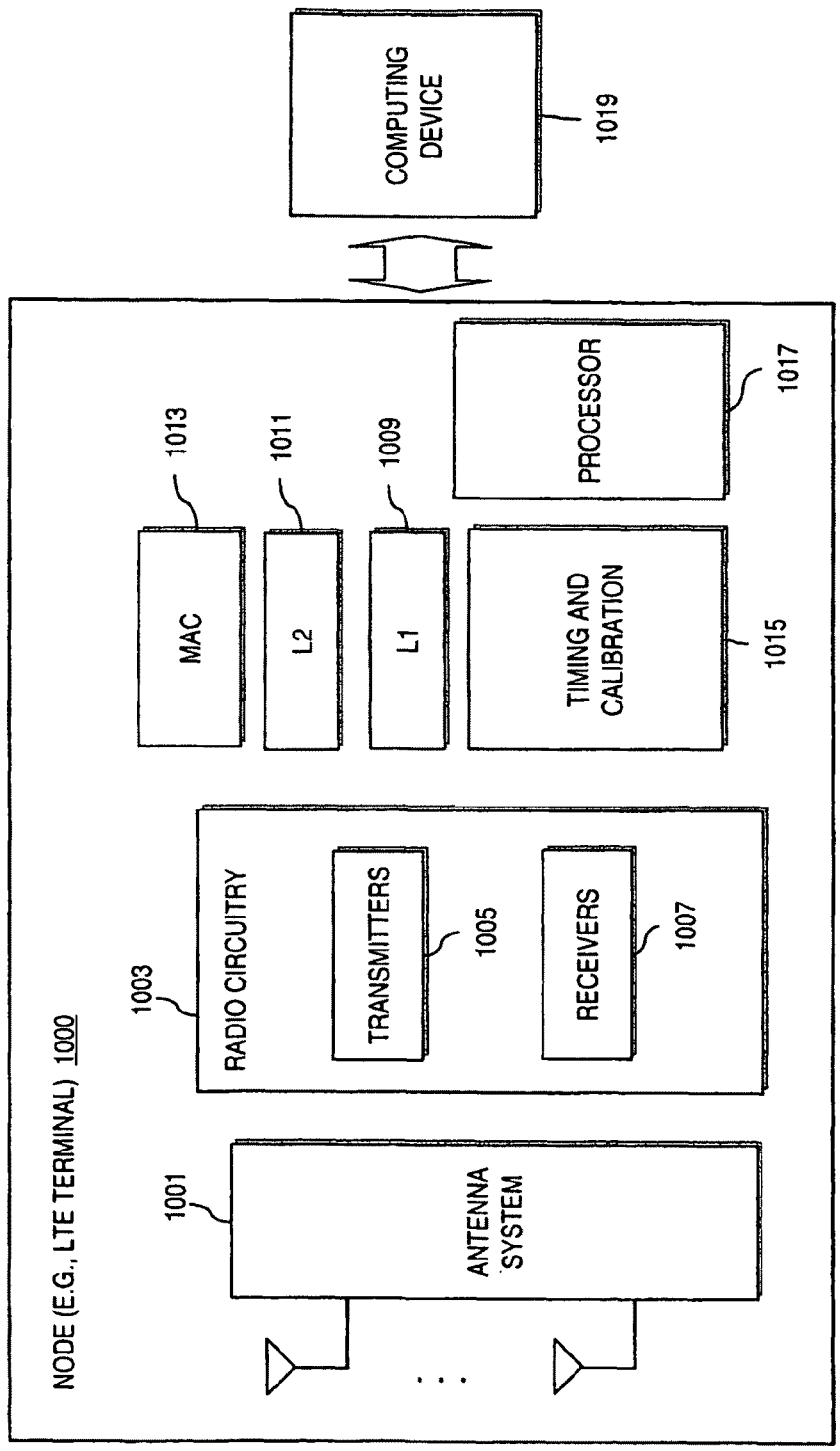
FIG. 10 is a diagram of exemplary components of a terminal capable of operating in the system of FIG. 1, according to an embodiment of the invention.

FIG. 10 is a diagram of exemplary components of a terminal capable of operating in the system of FIG. 1, according to an embodiment of the invention. A terminal 1000 is configured to operate in a Multiple Input Multiple Output (MIMO) system, or alternatively in single antenna system. Consequently, an antenna system 1001 provides for multiple antennas to receive and transmit signals. The antenna system 1001 is coupled to radio circuitry 1003, which includes multiple transmitters 1005 and receivers 1007. The radio circuitry encompasses all of the Radio Frequency (RF) circuitry as well as base-band processing circuitry. As shown, layer-1 (L1) and layer-2 (L2) processing are provided by units 1009 and 1011, respectively. Optionally, layer-3 functions can be provided (not shown). Module 1013 executes all Medium Access Control (MAC) layer functions. A timing and calibration module 1015 maintains proper timing by interfacing, for example, an external timing reference (not shown). Additionally, a processor 1017 is included. Under this scenario, the terminal 1000 communicates with a computing device 1019, which can be a personal computer, work station, a PDA, web appliance, cellular phone, etc.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining by a first node in a network a neighborhood of nodes in the network, wherein each node in the neighborhood is a neighbor to the first node;
    sensing, at the first node and from the neighborhood of nodes, radio-frequency interference produced by nodes of the neighborhood and causing interference with the first node;
    generating information relating to the radio-frequency interference produced by the nodes of the neighborhood and sensed by the first node of the network, wherein the information comprises a mapping for a plurality of resources, the mapping comprising indications whether each of the plurality of resources was interfered with or was not interfered with by the nodes of the neighborhood and indications of resources allocated to the first node; and
    transmitting at least part of the information over a designated channel to one or more nodes in the neighborhood of nodes, wherein the transmitted information for uplink is limited to first information in the mapping indicating resources in the plurality of resources allocated to the first node for uplink, and the transmitted information for downlink comprises second information in the mapping for the downlink resources in the plurality of resources.

2. The method of claim 1, wherein the mapping comprises a matrix of words comprising both uplink and downlink information, the first information is one or more words indicating resources allocated to the first node for uplink and the second information is a plurality of words for a full matrix for the downlink resources.

3. An apparatus comprising:
    at least one processor; and
    at least one memory including computer program code;
    the at least one memory and the computer program code configured, with the at least one processor, to cause the apparatus to perform at least the following:
    determining by a first node in a network a neighborhood of nodes in the network, wherein each node in the neighborhood is a neighbor to the first node;

sensing, at the first node and from the neighborhood of nodes, radio-frequency interference produced by nodes of the neighborhood and causing interference with the first node;

generating information relating to the radio-frequency interference produced by the nodes of the neighborhood and sensed by the first node of the network, wherein the information comprises a mapping for a plurality of resources, the mapping comprising indications whether each of the plurality of resources was interfered with or was not interfered with by the nodes of the neighborhood and indications of resources allocated to the first node; and transmitting at least part of the information over a designated channel to one or more nodes in the neighborhood of nodes, wherein the transmitted information for uplink is limited to first information in the mapping indicating resources in the plurality of resources allocated to the first node for uplink, and the transmitted information for downlink comprises second information in the mapping for the downlink resources in the plurality of resources.

4. An apparatus according to claim 3, wherein the neighborhood of nodes includes at least one of a user equipment, an access point, or a combination thereof.

5. An apparatus according to claim 3, wherein the neighboring nodes are mobile devices.

6. An apparatus according to claim 3, wherein the information includes time information, frequency information, channelization code information, or a combination thereof.

7. An apparatus according to claim 3, wherein the channel is represented by one of a physical signal waveform, a single bit busy burst, a code-block, or a code block that is repetition coded and spread to a physical sequence.

8. An apparatus according to claim 3, wherein the network is a wireless network that has either an E-UTRA (Evolved Universal Terrestrial Radio Access) architecture or an Institute of Electrical and Electronics Engineers (IEEE) 802.16 architecture, an ad hoc architecture, or a mesh architecture.

9. An apparatus according to claim 3, wherein the apparatus comprises a user equipment or an access point.

10. An apparatus according to claim 3, wherein:
determining by a first node in a network a neighborhood of nodes further comprises:
receiving a signal from a node of a network, and in response to the signal exceeding a minimum threshold power level, decoding an address for the node; and
designating the node as a neighbor by storing the address for the node in a non-transitory computer-readable medium; and
transmitting further comprises transmitting, using the addresses, at least part of the information over a designated channel to the one or more nodes in the neighborhood of nodes.

11. An apparatus according to claim 3, wherein the at least one memory and the computer program code are further configured, with the at least one processor, to cause the apparatus to perform at least the following: performing resource allocation within the neighborhood based at least in part on the information.

12. An apparatus according to claim 11, wherein performing resource allocation within the neighborhood based at least in part on the information further comprises determining whether there are free resources based on the mapping, selecting a best resource by using a channel quality indicator for the free resources, and filling the selected best resource.

13. An apparatus according to claim 3, wherein the at least one memory and the computer program code are further configured, with the at least one processor, to cause the apparatus to perform at least the following: receiving third information from one or more of the nodes in the neighborhood, wherein the third information comprises a mapping for a plurality of resources, the mapping comprising indications whether the one or more nodes in the neighborhood determined each of the plurality of resources was interfered with or was not interfered with by the first node or by other nodes in the neighborhood.

14. An apparatus according to claim 13, further comprising performing resource allocation within the neighborhood based at least in part on the first and second information.

15. An apparatus comprising:
at least one processor; and
at least one memory including computer program code;
the at least one memory and the computer program code configured, with the at least one processor, to cause the apparatus to perform at least the following:
determining by a first node in a network a neighborhood of nodes in the network, wherein each node in the neighborhood is a neighbor to the first node;
receiving information at the first node relating to radio-frequency interference for one or more nodes in the neighborhood, wherein the information comprises a mapping for a plurality of resources, the mapping comprising indications whether the one or more nodes in the neighborhood determined each of the plurality of resources was interfered with or was not interfered with by the first node or other nodes in the neighborhood and indications of resources allocated to the one or more nodes, wherein the received information for uplink from a particular node is limited to first information in the mapping indicating resources in the plurality of resources allocated to the particular node for uplink, and the received information for downlink from the particular node comprises second information in the mapping for the downlink resources in the plurality of resources for the particular node;
performing resource allocation within the neighborhood based at least in part on the information.

16. An apparatus according to claim 15, wherein the first node is part of a neighborhood of nodes that includes a user equipment, an access point, or a combination thereof.

17. An apparatus according to claim 15, wherein the interference information includes interference or allocation of the plurality of resources for time-frequency resources in a time-frequency resource space for both uplink and downlink.

18. An apparatus according to claim 15, wherein the channel is represented by one of a physical signal waveform, a single bit busy burst, a code-block, or a code block that is repetition coded and spread to a physical sequence.

19. An apparatus according to claim 15, wherein the network is a wireless network that has either an E-UTRA (Evolved Universal Terrestrial Radio Access) architecture or an Institute of Electrical and Electronics Engineers (IEEE) 802.16 architecture.

20. An apparatus according to claim 15, wherein the apparatus comprises a user equipment or an access point.

* * * * *